(12) United States Patent
Srinivasan et al.

(10) Patent No.: US 8,799,659 B2
(45) Date of Patent: Aug. 5, 2014

(54) ADVANCED MULTI-CHANNEL WATERMARKING SYSTEM AND METHOD

(75) Inventors: Venugopal Srinivasan, Palm Harbor, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 12/193,703

(22) Filed: Aug. 18, 2008

(65) Prior Publication Data

US 2009/0074185 A1  Mar. 19, 2009

Related U.S. Application Data

(60) Provisional application No. 60/956,545, filed on Aug. 17, 2007.

(51) Int. Cl.
*H04L 9/32* (2006.01)

(52) U.S. Cl.
USPC .............. 713/176; 380/207; 386/260; 705/57

(58) Field of Classification Search
CPC ................... H04L 2209/603; H04L 2209/605; H04L 2209/608; H04N 21/8106; H04N 21/8358; H04N 21/233; H04N 21/4394; H04N 1/3232; G11B 20/00884; G11B 20/00905; G11B 20/00891; G11B 20/00913
USPC ................... 380/207; 386/260; 713/176, 713; 705/57

See application file for complete search history.

(56) References Cited

U.S. PATENT DOCUMENTS

| | | |
|---|---|---|
| 6,996,521 B2 | 2/2006 | Iliev et al. |
| 7,006,661 B2 | 2/2006 | Miller et al. |
| 7,050,603 B2 | 5/2006 | Rhoads et al. |
| 7,460,684 B2 | 12/2008 | Srinivasan |
| 7,567,721 B2 | 7/2009 | Alattar et al. |
| 7,705,753 B2 | 4/2010 | Speirs et al. |
| 8,131,760 B2 | 3/2012 | Levy |
| 2001/0019618 A1 | 9/2001 | Rhoads |
| 2002/0120849 A1 | 8/2002 | McKinley et al. |
| 2003/0103645 A1 | 6/2003 | Levy et al. |
| 2003/0133590 A1 | 7/2003 | Miller et al. |
| 2004/0059918 A1 | 3/2004 | Xu et al. |
| 2006/0075243 A1 | 4/2006 | Lakamp et al. |
| 2006/0210109 A1 | 9/2006 | Rhoads et al. |
| 2006/0222203 A1 | 10/2006 | Mercier |

(Continued)

FOREIGN PATENT DOCUMENTS

| | | |
|---|---|---|
| WO | 2009/025805 A1 | 2/2009 |
| WO | 2009/026263 A1 | 2/2009 |

OTHER PUBLICATIONS

International Search Report with Written Opinion, dated Nov. 13, 2008, received in international patent applicaiton No. PCT/US08/73532, 8 pgs.

(Continued)

*Primary Examiner* — Eleni Shiferaw
*Assistant Examiner* — Paul Callahan
(74) *Attorney, Agent, or Firm* — Æon Law; Adam L. K. Philipp

(57) ABSTRACT

A method, computer program product, and computing device for modifying a first channel portion of a digital media data file to include at least a first primary watermark. A second channel portion of the digital media data file is modified to include at least a first secondary watermark, wherein the first secondary watermark is the complement of the first primary watermark.

5 Claims, 18 Drawing Sheets

(56) References Cited

U.S. PATENT DOCUMENTS

| | | | |
|---|---|---|---|
| 2006/0224896 | A1 | 10/2006 | Takagi et al. |
| 2006/0239503 | A1 | 10/2006 | Petrovic et al. |
| 2006/0269096 | A1 | 11/2006 | Kumar et al. |
| 2007/0064940 | A1 | 3/2007 | Moskowitz et al. |
| 2007/0113094 | A1 | 5/2007 | Moskowitz et al. |
| 2009/0129627 | A1 | 5/2009 | Levy et al. |

OTHER PUBLICATIONS

International Search Report and Written Opinion received for Patent Application No. PCT/US08/09888, mailed on Nov. 19, 2008, 5 pages.

International Preliminary Report on Patentability and Written Opinion received for PCT Patent Application No. PCT/US08/73532, issued on Feb. 24, 2010, 5 pages.

International Preliminary Report on Patentability and Written Opinion received for PCT Patent Application No. PCT/US08/09888, issued on Feb. 24, 2010, 5 pages.

Non-Final Office Action received for U.S. Appl. No. 13/533,819 mailed on May 24, 2013, 11 pages.

Non-Final Office Action received for U.S. Appl. No. 12/300,566 mailed on Oct. 25, 2011, 21 pages.

Non-Final Office Action received for U.S. Appl. No. 12/193,709 mailed on Jul. 20, 2011, 14 pages.

Notice of Allowance received for U.S. Appl. No. 12/193,709 mailed on Mar. 21, 2012, 17 pages.

Response to Non-Final Office Action received for U.S. Appl. No. 12/193,709, filed Jul. 20, 2011, 16 Pages.

Response to Non-Final Office Action received for U.S. Appl. No. 12/300,980, filed Nov. 16, 2012, 7 pages.

Non-Final Office Action received for U.S. Appl. No. 12/300,980 mailed on Aug. 16, 2012, 8 pages.

Notice of Allowance received for U.S. Appl. No. 12/300,980 mailed on Dec. 3, 2012, 7 pages.

FIG. 9A: transaction identifier (226) | asset identifier (228)

FIG. 9B: space (238) | asset identifier (228) | transaction identifier (226) | space (238) | asset identifier (228)

FIG. 9C: space (238) | asset identifier (228) | distributor identifier (234) | content provider identifier (236) | transaction identifier (226) | space (238) | speed change word (232) | transaction identifier (226)

FIG. 9D: transaction identifier (226) | synchronization word (230) | asset identifier (228) | speed change word (232) | distributor identifier (234) | asset identifier (228) | space (238)

FIG. 9E: synchronization word (230) | transaction identifier (226) | content provider identifier (236) | transaction identifier (208) | distributor identifier (234) | asset identifier (228) | synchronization word (230)

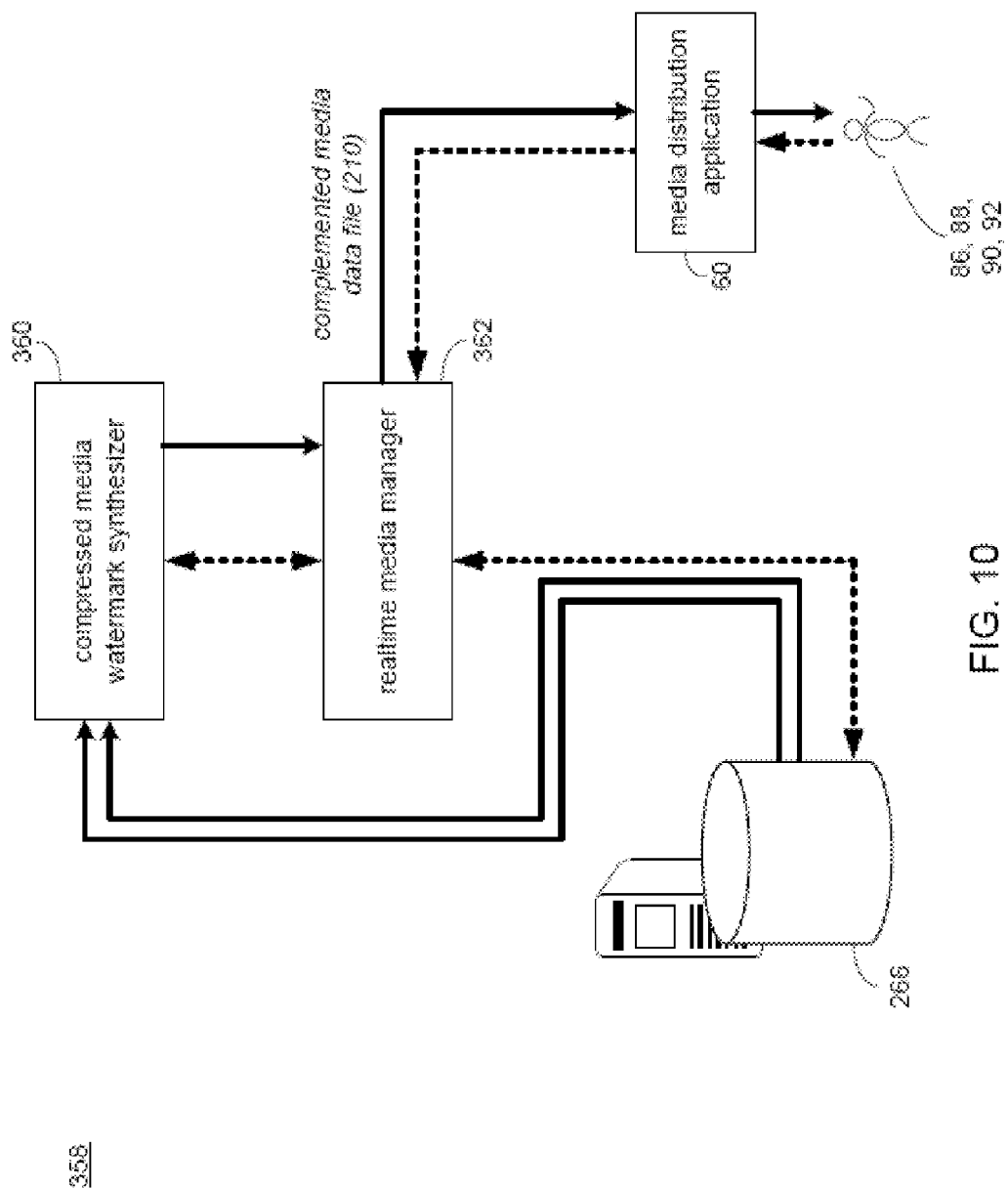

504

506

508

ADVANCED MULTI-CHANNEL WATERMARKING SYSTEM AND METHOD

RELATED APPLICATION

This application claims the benefit of the following application, which is herein incorporated by reference: U.S. Provisional Patent Application No. 60/956,545, entitled "Advanced Two-Stage Transactional Audio Watermarking", filed 17 Aug. 2007.

TECHNICAL FIELD

This application relates to watermarking of digital media and, more particularly, to digital watermarking wherein multiple channels of digital media are embedded with watermarks and watermark complements.

BACKGROUND

The advent of digital media, such as digital speech, audio, graphics, images, and video, has significantly improved many existing applications, as well as introduced many new applications. This is due, in large part, to the relative ease by which digital media may be stored, transmitted, searched, and accessed.

Media data is often analog data that is converted into digital data using e.g., Pulse Coded Modulation (PCM), which may result in the generation of a significant amount of digital data. As an example, high quality PCM digital music is available on Compact Disk (CD). When a music CD is encoded with stereo PCM digital music at a sampling rate of 44.1 kHz with 16 bits per sample (generating a raw data rate of 1411 kbits/s), the music CD is capable of storing about 650 megabytes of digital music with error correction (about 64 minutes of music) and about 746 megabytes of digital music without error correction (about 74 minutes of music).

Unfortunately, due to the size of the above-described PCM digital music files, when downloading/transferring such digital music files, the download/transfer may take a considerable amount of time. Thus, for efficient communication, storage and/or transmission of digital music files, the digital music files may be compressed using one of a plurality of compression techniques (e.g., MPEG and ITU-T standards committees, as well as proprietary solutions).

Over time the approaches used for compression have grown very sophisticated. Indeed, these approaches may allow high compression for audio that can reach a factor between 5 and 15, while still producing very high psychoacoustic quality that is similar to the uncompressed audio. Moreover, the compression factor attainable for video is even higher, and depending on the resolution, it can vary between factors of 10 and 100. For instance, due to such compression schemes, digitized movies with standard television resolution and quality have been available on Digital Video Discs (DVD's) for approximately 10 years, and they are now also available in High Definition format as well.

However, digital multimedia, if unprotected, also brings with it an increase in the risk of piracy. For one, the process of copying of digital multimedia content does not incur any additional loss of quality due to multigenerational effects (associated with analog audio or video tapes), as e.g., the one millionth copy is identical to the original. This is not only a problem with uncompressed multimedia, but even more so with compressed multimedia. With modest compression factors of, e.g., 5, the quality of music can remain perceptually perfect when state of the art compression schemes are used, while enabling a music album to be downloaded/transferred 5 times faster (e.g., in about 6 minutes instead of 30 minutes).

Furthermore, extraction tools are freely available on the internet for ripping of CDs and protected DVDs, as well as tools for re-compressing multimedia content in various formats. Coupled with the advent of peer-to-peer (P2P) networking, large multimedia files can be easily posted on the internet and illegally shared with millions of users. This results in a significant amount of piracy and, thus, lost revenues for content owners. Further, this type of piracy requires complex monitoring to determine the identity of pirates and downloaders of pirated content. Thus, digital multimedia, if unprotected, can pose a significant challenge to preventing piracy.

To address this challenge, a committee effort was launched in 1998 for developing a Secure Digital Music Initiative (SDMI) standard that comprised a specification for portable devices and an overall architecture for delivery of digital music. Digital watermarks were proposed as a key component of the SDMI system. The embedded watermarks, when extracted by a suitable detector, could be used to control aspects of a digital music system (e.g., permit or deny recording, allow copying a certain number of times). Other notable uses of digital watermarks include their ability to establish authorship or ownership, define usage rights and copyright control, and verify the integrity of the content.

In September of 2000, SDMI invited the public to test the attack resistance of its watermarking technology. While a discussion of the results of these tests is beyond the scope of this application, many vulnerabilities of specific watermarking technologies were demonstrated during the SDMI challenge. This eventually led to the abandonment of SDMI's program.

In general, digital watermarks can be either robust or fragile depending on their design. A robust watermark is intended to survive common attacks by securely carrying embedded information, while a fragile watermark is intended to indicate whether the audio signal has been changed due to certain processing methods, including compression, filtering, as well as some types of attack. In the past, watermarks, such as those developed by SDMI, have predominately been used to carry information about access rights to a multimedia file by the user. However, they can also be used to transport information about a user-initiated multimedia file purchase transaction.

Transactional watermarking may thus be described as the process of digital watermarking of each copy of multimedia content with a unique watermark to allow identification of the specific transaction, which may include information related to the purchase and/or download of the multimedia content itself. This type of watermarking introduces additional technological hurdles as compared to general watermarking, as information about a transaction is only available at the time of the transaction. Therefore, embedding must be performed in realtime (i.e., at the time of the transaction).

Conventionally, transactional watermarking has yielded functional, but less than ideal results. For example, FIG. 1a shows a high-level view of conventional watermarking system 10 for watermarking of digital audio. Digital audio may be provided as input to watermark embedder 12 as well as to perceptual analyzer 14. Concurrently, the message to be embedded in the digital audio file may be provided to watermark generator 16, which converts the message to binary code (i.e., watermark) for embedding. Watermark embedder 12 performs the function of embedding this watermark in the audio signal of the digital audio file, but does so while ensuring that the watermark is below the threshold of audibility. To accomplish this, perceptual analyzer 14 measures the amount of masking energy present and modulates the strength of the watermark to be embedded. Watermark embedder 12 may employ any number of known principles of watermarking, however, a spread spectrum embedder generally provides higher quality results. The resulting watermarked audio signal is then encoded (i.e., compressed) by digital audio encoder 18 (e.g., MP3, AAC, WindowsMediaAudio (WMA), or RealAudio (RA) encoder), resulting in a watermarked compressed digital audio file of corresponding format.

The primary limitations of this system are that it is not practical for realtime distribution on a large scale and the embedded watermark may produce audible interference. For example, if employed as an online music store application, conventional watermarking system 10 may result in a system of very high complexity that would be highly inefficient when serving a large number of music files simultaneously. As discussed above, due to size considerations, online music/media stores generally distribute compressed media files to promote efficient transmission (as well as efficient storage), which may be performed after a media file has been watermarked. However, since transaction information is only known at the time of the transaction, such a system requires realtime watermarking and realtime encoding of thousands, and possibly tens of thousands, of music streams being requested at any given time. Further, while perceptual analyzer 14 may attempt to mask the audible energy of the watermark by the native audio, audible interference may still result. In addition to less than ideal audio quality, such a system can be excessively complex, expensive, and delay sensitive for an online store application.

An example of a conventional approach intended to remedy the limitations of conventional watermarking system 10 is shown at FIG. 1b. Alternate conventional watermarking system 20 of FIG. 1b operates in compressed (bitstream) domain 22. In this system, digital music/audio files may first be encoded by a digital audio encoder 24 similar to that discussed earlier. The resulting compressed audio streams are then stored in compressed media server 26. When specific music content is requested, the corresponding stream is retrieved from compressed media server 26, and partially decoded in partial digital audio decoder 28 to prepare it for embedding of a watermark. The message provided as input to watermark generator 30 is converted to binary code (representing a watermark) and then provided to quantizer scale factors sequence changes mapper 32.

Quantizer scale factors sequence changes mapper 32 alters aspects of the audio encoding that, for example, can slightly change the quantization scale factors of the audio signal of the digital audio file to mimic a sequence of binary digits in order to form a watermark. The selected quantization scale factors may then need to be re-applied on transform coefficients and the changed scale factors, as well as resulting coefficients, may need to be re-encoded in partial digital audio re-encoder 34. The resulting compressed stream is then output, and carries a hidden watermark that may be extracted by a watermark extractor by correctly interpreting embedded variations in quantization scale factors.

The primary limitations of alternate conventional watermarking system 20 are that it is not highly robust, and the audio quality concerns of conventional watermarking system 10 were not addressed. Due to the fact that it operates entirely in the compressed bitstream domain, the coding parameters (e.g., quantization scale factors) of the resulting watermarked compressed digital audio file are rather easy to modify, rendering the watermark useless. A secondary limitation arises from the practical need for fast processing. While alternate conventional watermarking system 20 is more efficient than conventional watermarking system 10, as it operates in compressed domain, the amount of possible realtime processing is still limited. Moreover, and similar to conventional watermarking system 10, audio quality still relies upon the ability of quantizer scale factors sequence changes mapper 32 to mask the embedded watermark's audible energy.

Overall, at the present time, no single commercial watermarking solution exists that can efficiently, securely, in large numbers, and in realtime, address the problem of recording transactional watermarks into multimedia content with essentially no audible change to the native audio.

SUMMARY OF DISCLOSURE

In a first implementation, a method includes modifying a first channel portion of a digital media data file to include at least a first primary watermark. A second channel portion of the digital media data file is modified to include at least a first secondary watermark, wherein the first secondary watermark is a complement of the first primary watermark.

One or more of the following features may be included. The first primary watermark may include one or more of a transaction identifier, an asset identifier, a synchronization word, a speed change word, a space, a content provider identifier, and a distributor identifier. The first channel portion of the digital media data file may include a left audio channel. The second channel portion of the digital media data file may include a right audio channel. The second channel portion of the digital media data file may include a left audio channel. The first channel portion of the digital media data file may include a right audio channel. The digital media data file may be selected from the group consisting of an audio file and a digital audio portion of a digital audio-visual file. The digital media data file may include at least a third channel portion.

In another implementation, a computer program product resides on a computer readable medium having a plurality of instructions stored on it. When executed by a processor, the instructions cause the processor to perform operations including modifying a first channel portion of a digital media data file to include at least a first primary watermark. A second channel portion of the digital media data file is modified to include at least a first secondary watermark, wherein the first secondary watermark is a complement of the first primary watermark.

One or more of the following features may be included. The first primary watermark may include one or more of a transaction identifier, an asset identifier, a synchronization word, a speed change word, a space, a content provider identifier, and a distributor identifier. The first channel portion of the digital media data file may include a left audio channel. The second channel portion of the digital media data file may include a right audio channel. The second channel portion of the digital media data file may include a left audio channel. The first channel portion of the digital media data file may include a right audio channel. The digital media data file may be selected from the group consisting of an audio file and a digital audio portion of a digital audio-visual file. The digital media data file may include at least a third channel portion.

In another implementation, a computing device is configured to perform operations including modifying a first channel portion of a digital media data file to include at least a first primary watermark. A second channel portion of the digital media data file is modified to include at least a first secondary watermark, wherein the first secondary watermark is a complement of the first primary watermark.

One or more of the following features may be included. The first primary watermark may include one or more of a transaction identifier, an asset identifier, a synchronization word, a speed change word, a space, a content provider identifier, and a distributor identifier. The first channel portion of the digital media data file may include a left audio channel. The second channel portion of the digital media data file may include a right audio channel. The second channel portion of the digital media data file may include a left audio channel. The first channel portion of the digital media data file may include a right audio channel. The digital media data file may be selected from the group consisting of an audio file and a digital audio portion of a digital audio-visual file. The digital media data file may include at least a third channel portion.

In another implementation, a method includes modifying a left audio channel of a digital media data file to include at least a first primary watermark. A right audio channel of the digital media data file is modified to include at least a first secondary watermark, wherein the first secondary watermark is a complement of the first primary watermark. The first primary watermark includes one or more of a transaction identifier, an asset identifier, a synchronization word, a speed change word, a space, a content provider identifier, and a distributor identifier.

One or more of the following features may be included. The digital media data file may be selected from the group consisting of an audio file and a digital audio portion of a digital audio-visual file.

In another implementation, a method of extracting a watermark includes obtaining a digital media data file that includes a first channel portion and a second channel portion. The first channel portion includes at least a first primary watermark and the second channel portion includes at least a first secondary watermark. The first secondary watermark is a complement of the first primary watermark. A difference signal between the first channel portion and the second channel portion may be determined, whereby the strength of the at least the first primary watermark is enhanced.

One or more of the following features may be included. The first channel portion of the digital media data file may include a left audio channel. The second channel portion of the digital media data file may include a right audio channel. The second channel portion of the digital media data file may include a left audio channel. The first channel portion of the digital media data file may include a right audio channel.

The details of one or more implementations are set forth in the accompanying drawings and the description below. Other features and advantages will become apparent from the description, the drawings, and the claims.

BRIEF DESCRIPTION OF THE DRAWINGS

FIGS. 9(a)-9(e) are diagrammatic views of exemplary watermark placements as executed by the digital media watermarking system of FIG. 2;

FIG. 10 is a diagrammatic view of a portion of the digital media watermarking system of FIG. 2;

Like reference symbols in the various drawings indicate like elements.

DETAILED DESCRIPTION OF EXEMPLARY EMBODIMENTS

System Overview

Figure 1A:
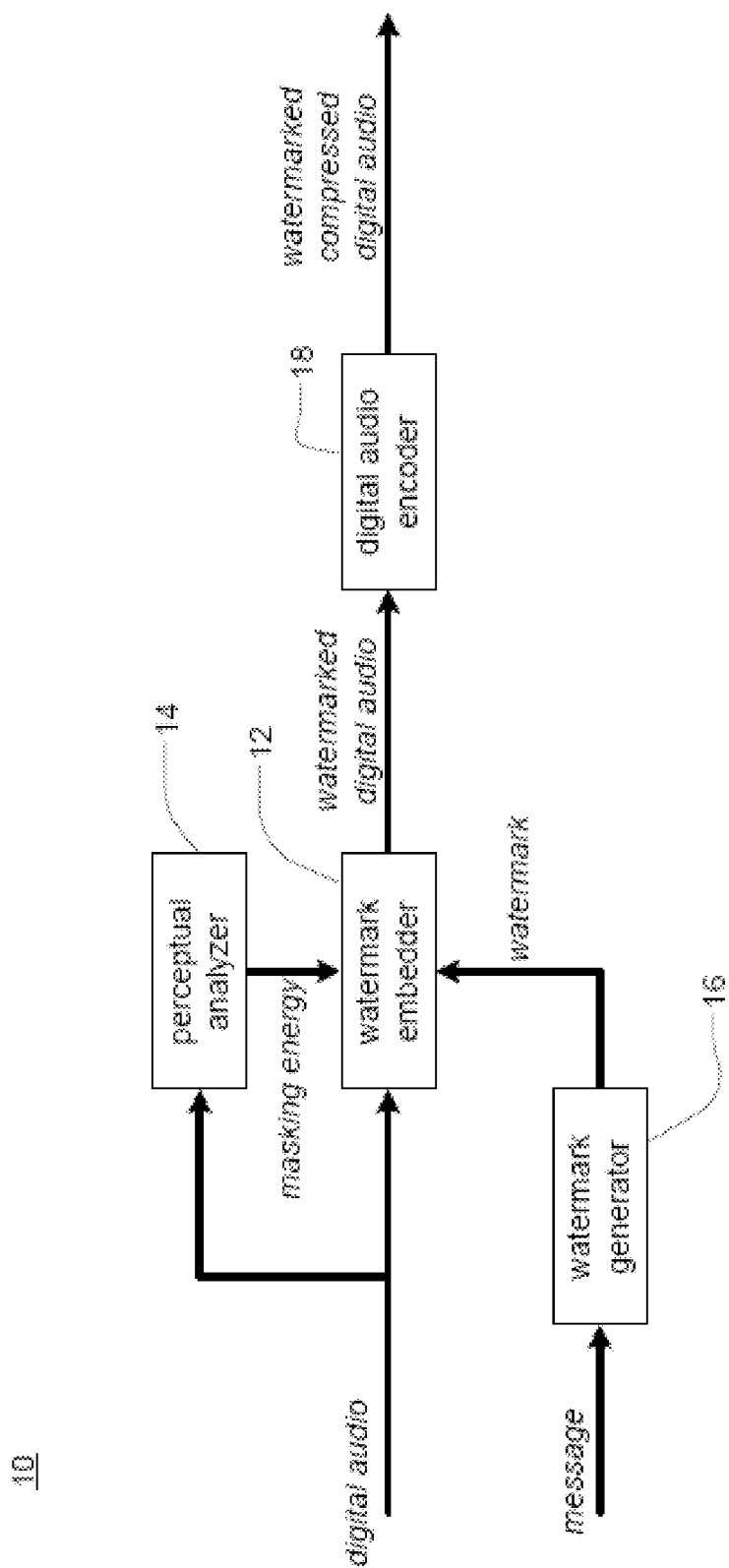
FIG. 1(a) is a flowchart of a prior art watermarking system.
Figure 1B:
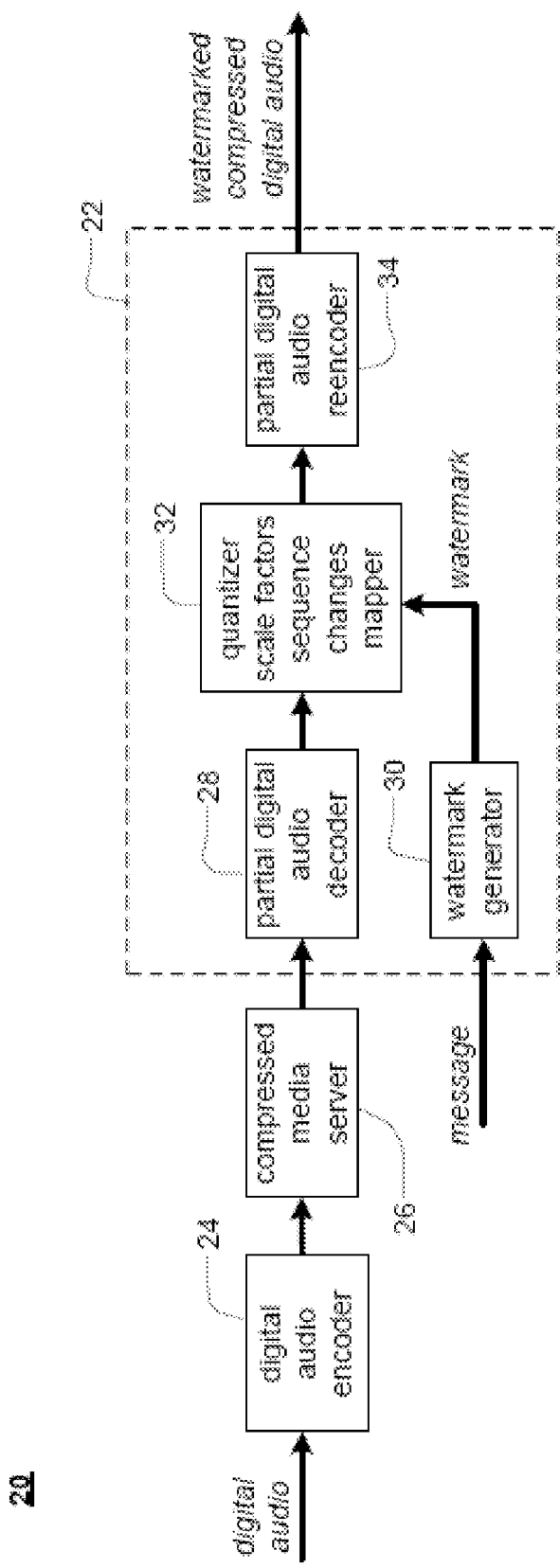
FIG. 1(b) is a flowchart of another prior art watermarking system.
Figure 2:
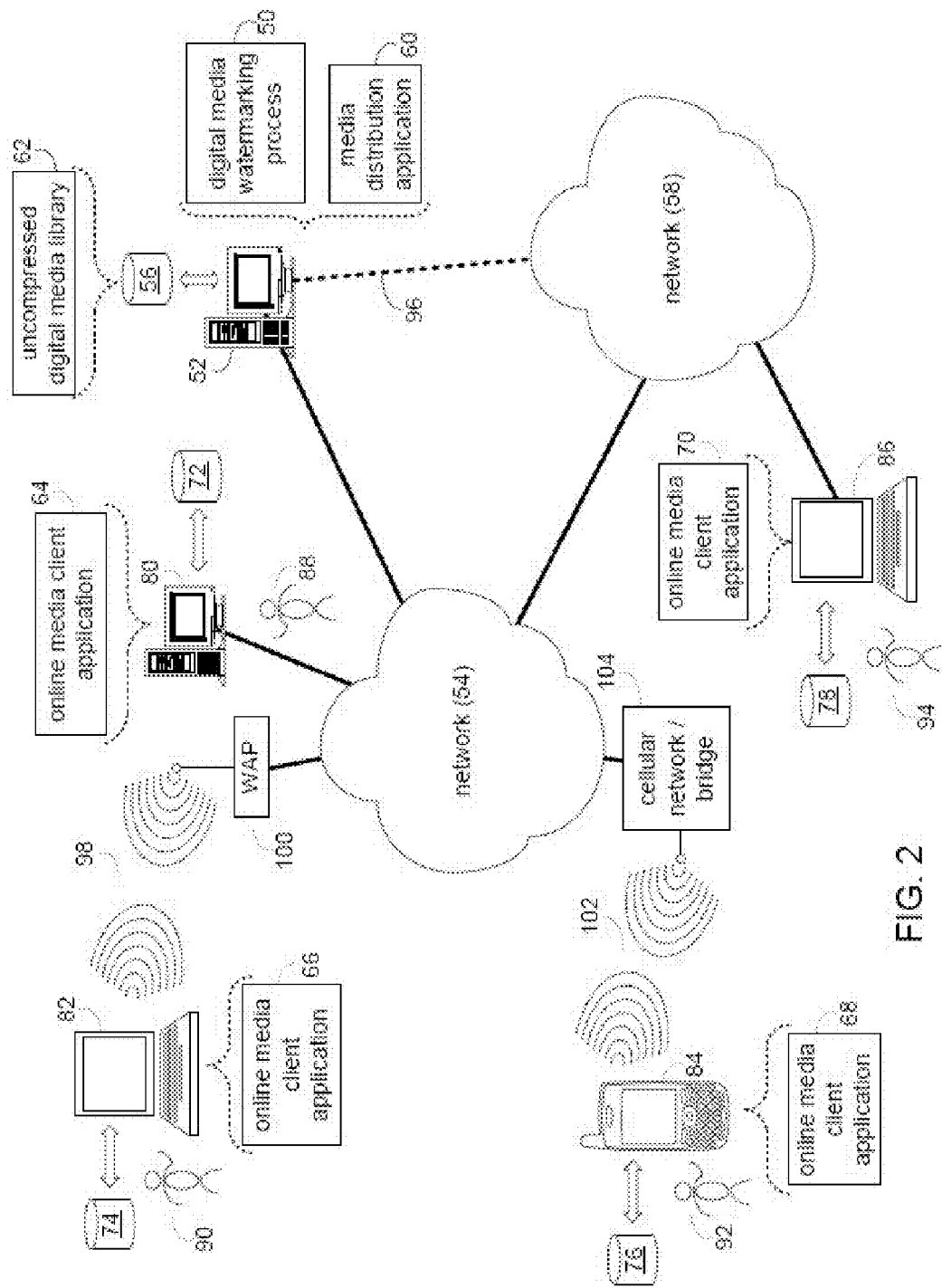
FIG. 2 is a diagrammatic view of a digital media watermarking system, a media distribution application, and client applications coupled to a distributed computing network.

Referring to FIG. 2, there is shown digital media watermarking process 50 that may reside on and may be executed by server computer 52, which may be connected to network 54 (e.g., the Internet or a local area network). Examples of server computer 52 may include, but are not limited to: a personal computer, a server computer, a series of server computers, a mini computer, and a mainframe computer. Server computer 52 may be a web server (or a series of servers) running a network operating system, examples of which may include but are not limited to: Microsoft Windows XP Server™; Novell Netware™; or Redhat Linux™, for example. Alternatively, digital media watermarking process 50 may reside on and be executed, in whole or in part, by a client electronic device, such as a personal computer, notebook computer, personal digital assistant, or the like.

The instruction sets and subroutines of digital media watermarking process 50, which may be stored on storage device 56 coupled to server computer 52, may be executed by one or more processors (not shown) and one or more memory architectures (not shown) incorporated into server computer 52. Storage device 56 may include but is not limited to: a hard disk drive; a tape drive; an optical drive; a RAID array; a random access memory (RAM); and a read-only memory (ROM).

Server computer 52 may execute a web server application, examples of which may include but are not limited to: Microsoft IIS™, Novell Webserver™, or Apache Webserver™, that allows for HTTP (i.e., HyperText Transfer Protocol) access to server computer 52 via network 54. Network 54 may be connected to one or more secondary networks (e.g., network 58), examples of which may include but are not limited to: a local area network; a wide area network; or an intranet, for example.

Server computer 52 may execute a media distribution application, examples of which may include, but are not limited to RealNetworks Rhapsody Server™, Apple iTunes Server™, and Microsoft Windows Media Server™ Media distribution application 60 may distribute requested media content from digital media watermarking process 50 (which acquires uncompressed digital media files that may be stored, at least in part, in uncompressed media library 62, residing on storage device 56 of server computer 52) to online media client applications, e.g., online media client applications 64, 66, 68, 70. Examples of online media client applications 64, 66, 68, 70 may include but are not limited to RealNetworks Rhapsody™, Apple iTunes™, and Microsoft Windows Media Player™, for example. The requested media content provided to media distribution application 60 by digital media watermarking process 50 is stored in uncompressed digital media library 62. Digital media watermarking process 50 may be a stand alone application that interfaces with media distribution application 60 or an applet/application that is executed within media distribution application 60.

The instruction sets and subroutines of media distribution application 60, which may be stored on storage device 56 coupled to server computer 52 may be executed by one or more processors (not shown) and one or more memory architectures (not shown) incorporated into server computer 52.

As mentioned above, in addition/as an alternative to being a server-based application residing on server computer 52, digital media watermarking process 50 may be a client-side application (not shown) residing on one or more client electronic device 80, 82, 84, 86 (e.g., stored on storage device 72, 74, 76, 78, respectively), and executed by a processor (not shown) and memory architecture (not shown) incorporated into the one or more client electronic devices. The client-side digital media watermarking system (not shown) may be a stand alone application that interfaces with an online media client application (e.g., online media client applications 64, 66, 68, 70), or may be an applet/application that is executed within an online media client application. As such, digital media watermarking system 50 may be a client-side application, a server-based application, or a hybrid client-side/server-based application, which may be executed, in whole or in part, by server computer 52, and/or one or more client electronic device (e.g., client electronic devices 80, 82, 84, 86).

The instruction sets and subroutines of online media client applications 64, 66, 68, 70, which may be stored on storage devices 72, 74, 76, 78 (respectively) coupled to client electronic devices 80, 82, 84, 86 (respectively), may be executed by one or more processors (not shown) and one or more memory architectures (not shown) incorporated into client electronic devices 80, 82, 84, 86 (respectively). Storage devices 72, 74, 76, 78 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 80, 82, 84, 86 may include, but are not limited to, personal computer 80, laptop computer 82, personal digital assistant 84, notebook computer 86, a data-enabled, cellular telephone (not shown), and a dedicated network device (not shown), for example. Using online media client applications 64, 66, 68, 70, users 88, 90, 92, 94 may access media distribution application 60 and may request the delivery of media content.

Users 88, 90, 92, 94 may access media distribution application 60 directly through the device on which the online media client application (e.g., online media client applications 64, 66, 68, 70) is executed, namely client electronic devices 80, 82, 84, 86, for example. Users 88, 90, 92, 94 may access media distribution application 60 directly through network 54 or through secondary network 58. Further, server computer 52 (i.e., the computer that executes media distribution application 60) may be connected to network 54 through secondary network 58, as illustrated with phantom link line 96.

The various client electronic devices may be directly or indirectly coupled to network 54 (or network 58). For example, personal computer 80 is shown directly coupled to network 54 via a hardwired network connection. Further, notebook computer 86 is shown directly coupled to network 58 via a hardwired network connection. Laptop computer 82 is shown wirelessly coupled to network 54 via wireless communication channel 98 established between laptop computer 82 and wireless access point (i.e., WAP) 100, which is shown directly coupled to network 54. WAP 100 may be, for example, an IEEE 802.11a, 802.11b, 802.11g, 802.11n, Wi-Fi, and/or Bluetooth device that is capable of establishing wireless communication channel 98 between laptop computer 82 and WAP 100. Personal digital assistant 84 is shown wirelessly coupled to network 54 via wireless communication channel 102 established between personal digital assistant 84 and cellular network/bridge 104, which is shown directly coupled to network 54.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 80, 82, 84, 86 may each execute an operating system, examples of which may include but are not limited to Microsoft Windows™, Microsoft Windows CE™, Redhat Linux™, or a custom operating system.

Figure 3:
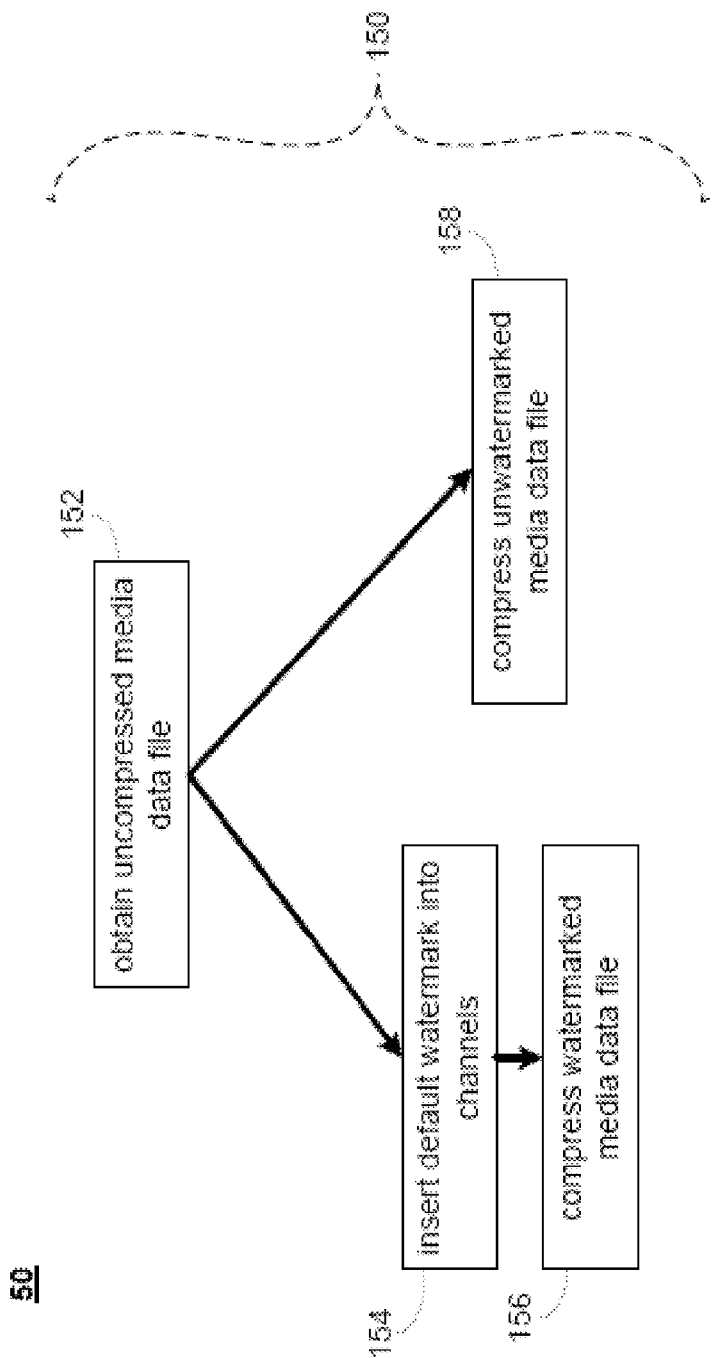
FIG. 3 is a flowchart of a process executed by the digital media watermarking system of FIG. 2.
Figure 4:
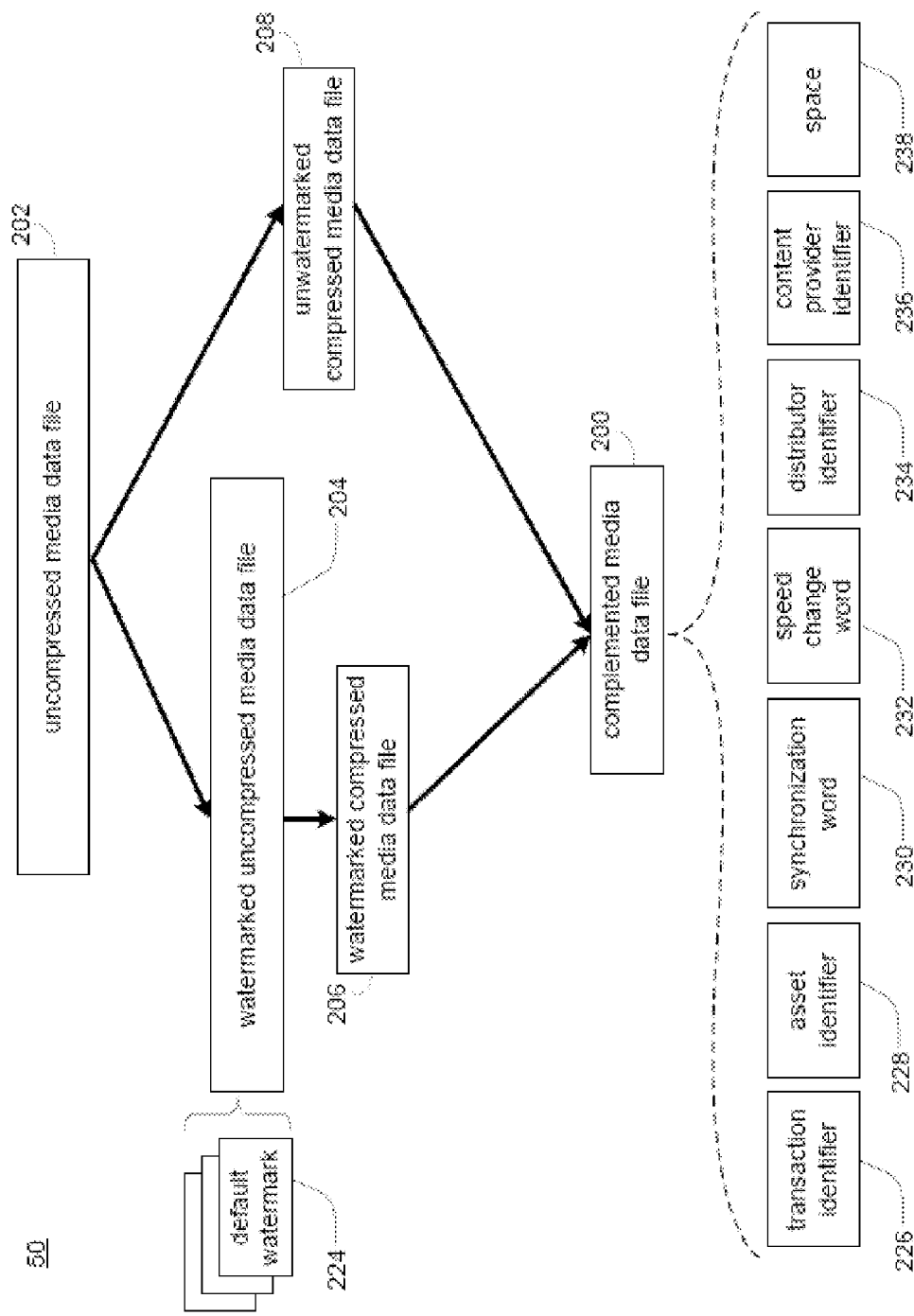
FIG. 4 is a diagrammatic view of a portion of the digital media watermarking system of FIG. 2.
Figure 5:
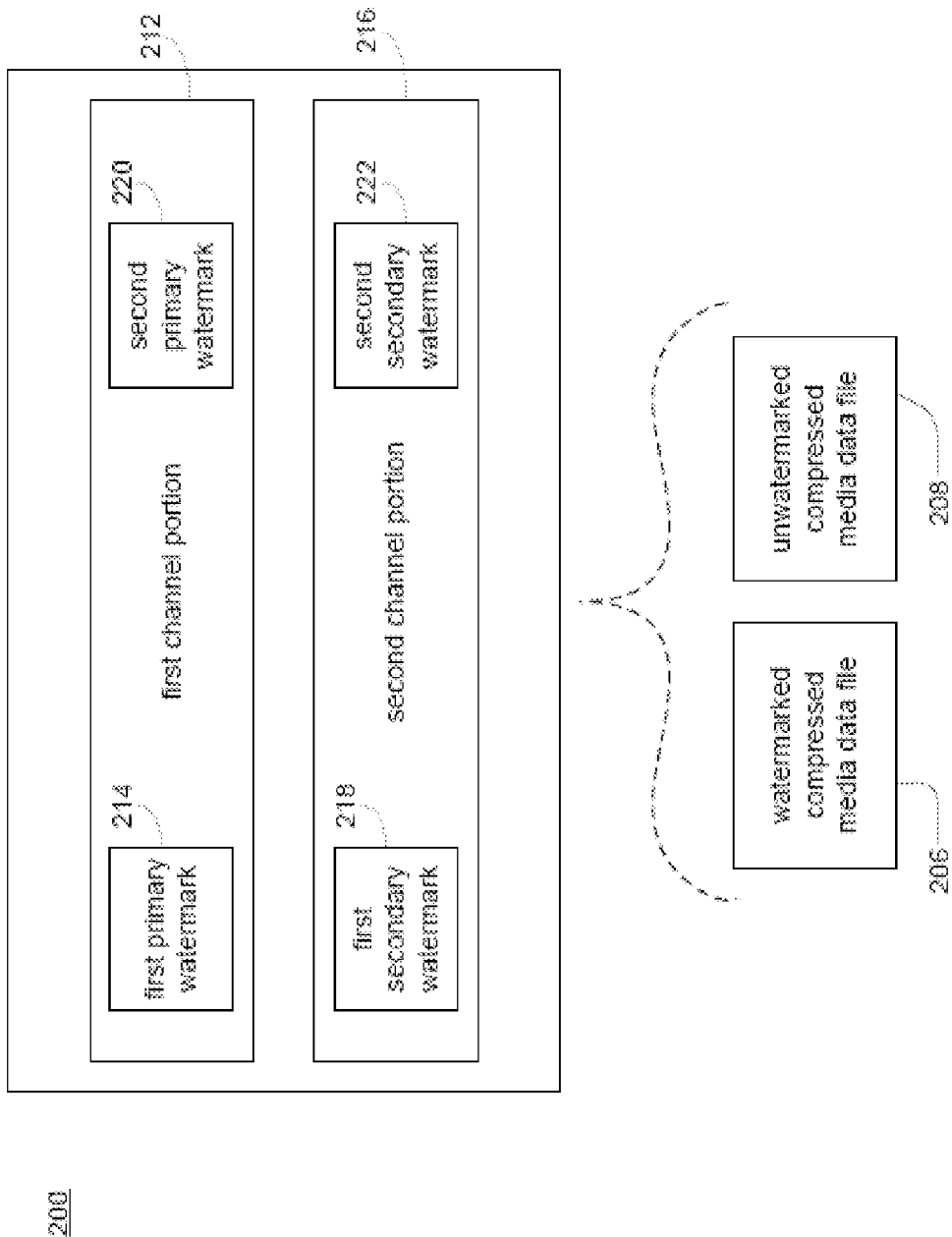
FIG. 5 is a diagrammatic view of a portion of the digital media watermarking system of FIG. 2.

Referring to FIGS. 3-5, there is shown a diagrammatic view of digital media watermarking process 50. While, as discussed above, digital media watermarking process 50 may be a stand alone application that interfaces with media distribution application 60 or an applet/application that is executed within media distribution application 60, for illustrative purposes, digital media watermarking process 50 will be described in this disclosure as being executed within media distribution application 60. Further, and also for illustrative purposes, media distribution application 60 will be described as an online music store. However, this is not to be construed as a limitation of this disclosure. Accordingly, the following discussion may be equally applied to a variety of media delivery systems, and/or in an independent digital media watermarking environment devoid of delivery considerations.

The following disclosure will describe the manner in which digital media watermarking process 50 generates complemented media data file 200 from uncompressed media data file 202. As will be discussed in greater detail below, complemented media data file 200 may include portions of: watermarked compressed media data file 206 and unwatermarked compressed media data file 208.

As will be discussed below in greater detail, digital media watermarking process 50 may include a method for modifying 150: a first channel portion 212 of uncompressed media data file 202 to include a first primary watermark 214; and a second channel portion 216 of uncompressed media data file 202 to include a first secondary watermark 218 (respectively). The first secondary watermark 218 is a complement of the first primary watermark 214.

Additionally and as will be discussed in greater detail below, digital media watermarking process 50 may modify 150 media data file 202 in several ways prior to a request from media distribution application 60 (i.e., prior to a transaction initiated by, e.g., users 88, 90, 92, 94). For example, such modifications 150 may include, but are not limited to: obtaining 152 uncompressed media data file 202; inserting 154 first primary watermark 214 into first channel portion 212 and inserting 154 first secondary watermark 218 into second channel portion 216 of uncompressed media data file 200 to form watermarked uncompressed media data file 204; compressing 156 watermarked uncompressed media data file 204 to form watermarked compressed media data file 206; and compressing 156 uncompressed media data file 202 to form unwatermarked compressed media data file 208. Accordingly, such pre-transaction modifications by digital media watermarking process 50 may be referred to as non-realtime processing 250. Conversely, and as will be described in detail below, post-transaction modifications by digital media watermarking process 50 may be referred to as realtime processing.

Figure 6A:
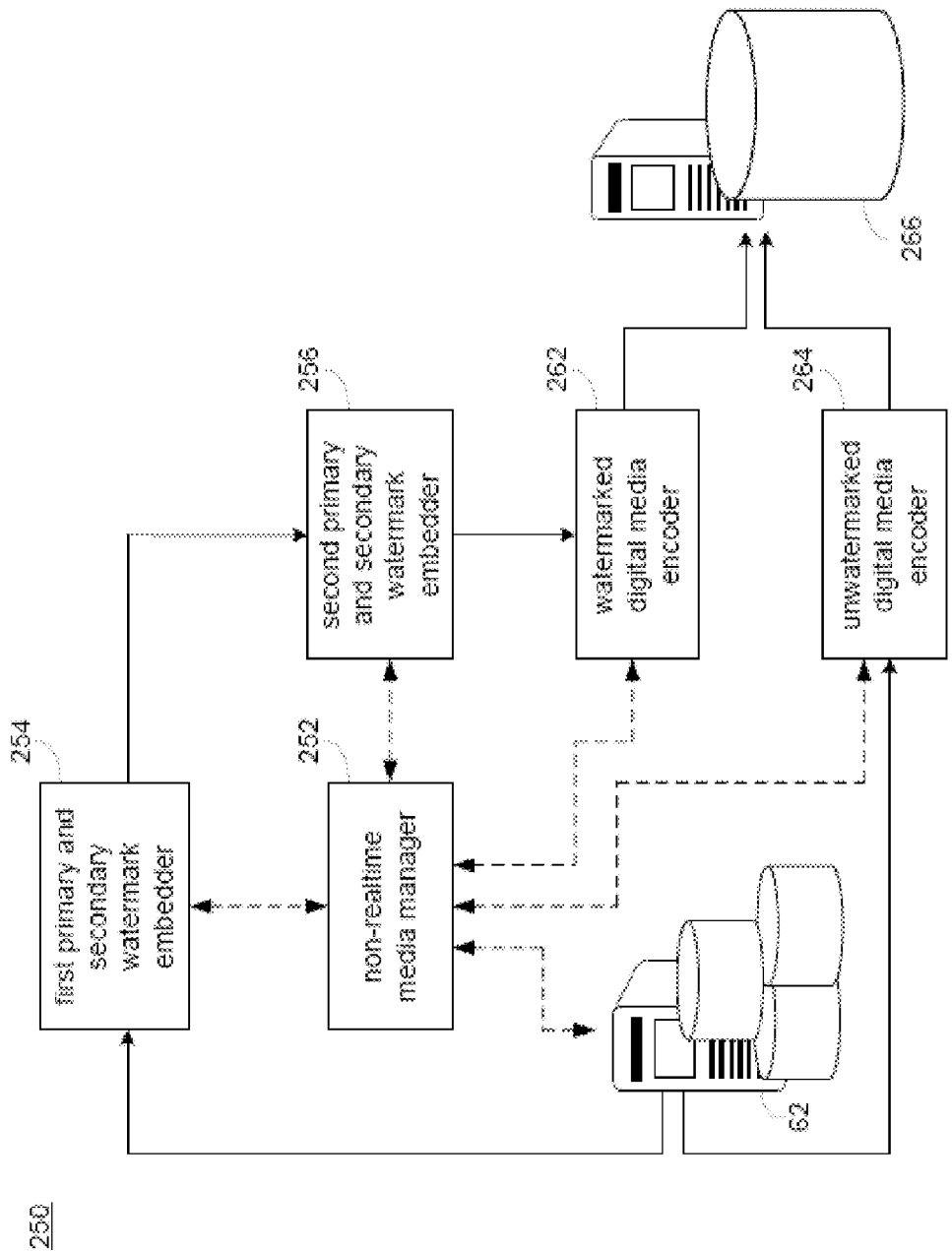
FIG. 6(a) is a diagrammatic view of a portion of the digital media watermarking system of FIG. 2.

Non-Realtime Processing:

Referring also to FIG. 6(a) and as discussed above, digital media watermarking process 50 may perform non-realtime processing 250 prior to initiation of a transaction by e.g., users 88, 90, 92, 94. For example, in preparation for distribution by media distribution application 60, digital media watermarking process 50 may perform non-realtime processing 250 on a subset (or all) of uncompressed media data files 202 stored in uncompressed digital media library 62. However, this is not to be construed as a limitation of this disclosure, as digital media watermarking process 50 may perform non-realtime processing 250 on a subset (or all) of uncompressed media data file 202 stored in uncompressed digital media library 62 in response to initiation of a transaction (i.e., in realtime) by e.g., users 88, 90, 92, 94.

When digital media watermarking process 50 is modifying 150 uncompressed media data file 202, digital media watermarking process 50 may first obtain 152 uncompressed media data file 202. For example, non-realtime media manager 252 of digital media watermarking process 50 may obtain 152 uncompressed media data file 202 from uncompressed digital media library 62. Uncompressed media data file 202 may include first channel portion 212 (e.g., a left channel) and second channel portion 216 (e.g., a right channel). Once obtained from uncompressed digital media library 62, non-realtime media manager 252 may provide uncompressed media data file 202 to first primary and secondary watermark embedder 254 for insertion 154 of first primary watermark 214 into first channel portion 212 and first secondary watermark 218 into second channel portion 216. Similarly, non-realtime media manager 252 may also provide uncompressed media data file 202 to second primary and secondary watermark embedder 256 for insertion 154 of second primary watermark 220 into first channel portion 212 and second secondary watermark 222 into second channel portion 216. As will be discussed in greater detail below, insertion 154 of such watermarks into uncompressed media data file 202 may form watermarked uncompressed media data file 204.

Examples of the format of uncompressed media data file 202 obtained 152 from uncompressed media data library 62 may include, but are not limited to: purchased downloads received from media distribution application 60 (i.e., media content licensed to e.g., user 88 for use in perpetuity); and subscription downloads received from media distribution application 60 (i.e., media content licensed to e.g., user 88 for use while a valid subscription exists with media distribution application 60), for example.

Uncompressed media data file 202 may be selected from the group consisting of an audio file and a digital audio portion of a digital audio-visual file. For example, while uncompressed media data file 202 is described herein as an audio (e.g., music) file, this is for exemplary purposes only. For example, uncompressed media data file 202 may be a digital audio portion of a digital audio-visual file. Accordingly, multi-media containers (i.e., files containing embedded audio and video streams) are also contemplated in the scope of this disclosure. Examples of such files may include, but are not limited to: RealMedia™ 3gp, ASF, AVI, MPEG-2, MP4, and MOV.

Examples of complemented media data file 200 (distributed by media distribution application 60) may include, but are not limited to: audio media data files (examples of which may include but are not limited to music files, audio news broadcasts, audio sports broadcasts, and audio recordings of books, for example); audio/video media data files (examples of which may include but are not limited to a/v news broadcasts, a/v sports broadcasts, feature-length movies and movie clips, music videos, and episodes of television shows, for example); and multimedia content media data files (examples of which may include but are not limited to interactive presentations and slideshows, for example).

First channel portion 212 of uncompressed media data file 202 may include, but is not limited to, a left audio channel. For example, where uncompressed media data file 202 comprises a music file, first channel portion 212 may include the left audio channel of the music file. Similarly, second channel portion 216 of uncompressed media data file 202 may include, but is not limited to, a right audio channel. For example, where uncompressed media data file 202 comprises a music file, second channel portion 216 may include the right audio channel of the music file. This is not to be construed as a limitation, however, as e.g., first channel portion 212 may include a right audio channel, and e.g., second channel portion 216 may include a left audio channel.

Additionally, first primary watermark 214 may include but is not limited to one or more default watermarks 224. As will be discussed in greater detail below, default watermarks 224 may include a positive or negative marker (representing, e.g., transaction identifier 226). This is not to be construed as a limitation of this disclosure, however. For example, first primary watermark 214 may include non-default information (not shown). Non-default information may include, but is not limited to: asset-specific information, thus forming asset identifier 228; synchronization information, thus forming synchronization word 230; speed change information, thus forming speed change word 232; distributor information, thus forming distributor identifier 234; content provider information, thus forming content provider identifier 236; and null information, thus forming space 238.

Similarly, first secondary watermark 218 may include but is not limited to one or more default watermarks 224. Again, and as will be discussed in greater detail below, default watermarks 224 may include a positive or negative marker (representing, e.g., transaction identifier 226). This is not to be construed as a limitation of this disclosure, however. For example, first secondary watermark 218 may include non-default information, such as asset identifier 228; synchronization word 230; speed change word 232; distributor identifier 234; content provider identifier 236; and space 238.

Figure 6B:
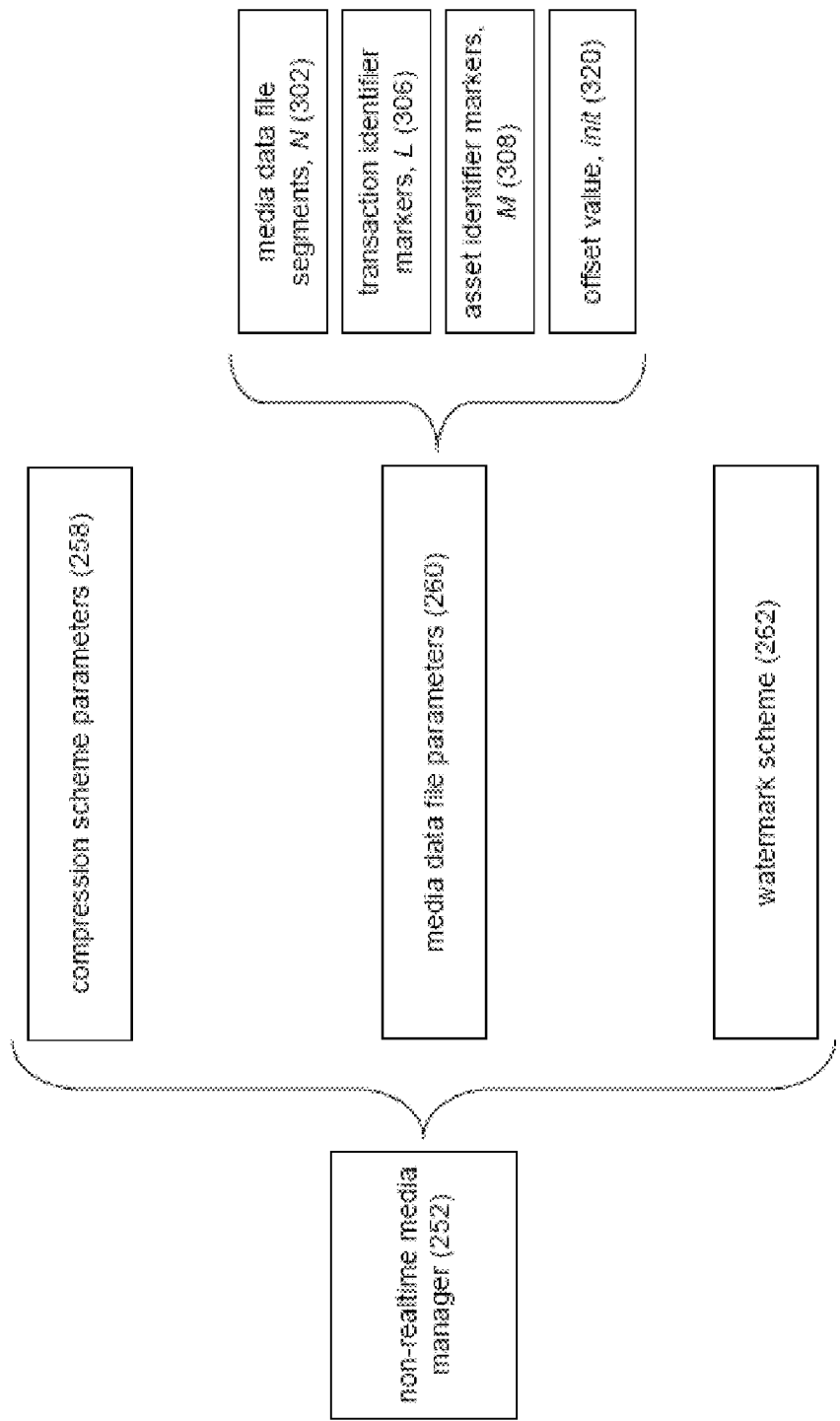
FIG. 6(b) is a diagrammatic view of exemplary encoding options controlled by a process executed by the digital media watermarking system of FIG. 2.

Referring also to FIG. 6(b), in addition to managing data propagation throughout non-realtime processing 250, non-realtime media manager 252 may also manage encoding options. Examples of encoding options may include but are not limited to: selection of compression scheme parameters 258 (examples of which are provided below); defining a plurality of media data file parameters 260 based upon, at least in part, the attributes of uncompressed media data file 202, watermarked compressed media data file 206, and unwatermarked compressed media data file 208; and selection of watermark scheme 262. The selection of watermark scheme 262 may include, but is not limited to, determining the type, frequency, and location of watermark insertion 154, as well as the parameters that define any particular watermark (e.g., watermark size, default watermark values, etc.).

Modifying 150 media data file 202 may further include inserting 154 first primary watermark 214 into first channel portion 212 and inserting 154 first secondary watermark 218 into second channel portion 216 of uncompressed media data file 202 to form watermarked uncompressed media data file 204.

Figure 7A:
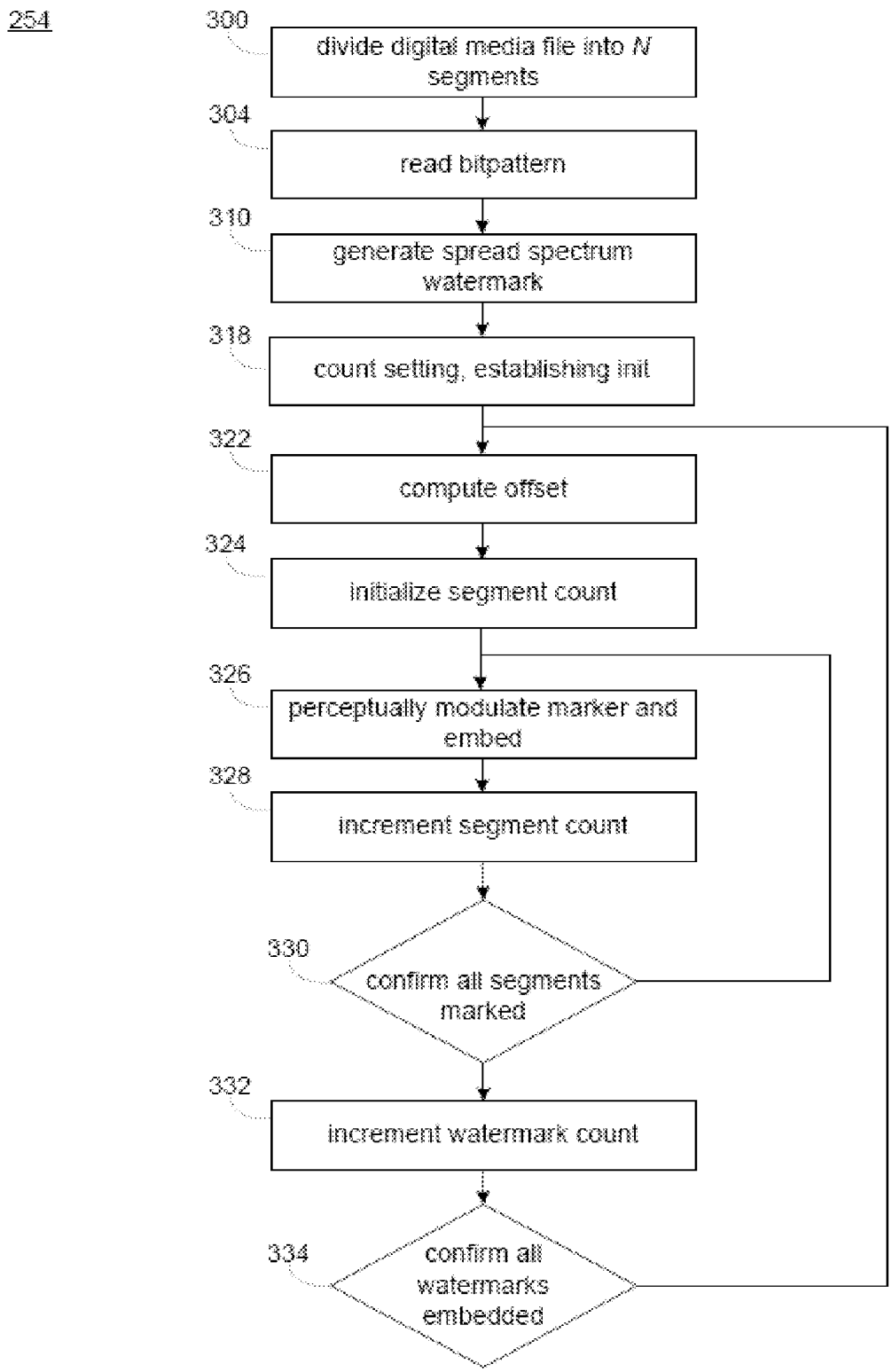
FIG. 7(a) is a flowchart of a process executed by the digital media watermarking system of FIG. 2.

Referring also to FIG. 7(a), the manner in which first primary and secondary watermark embedder 254 inserts 154 first primary watermark 214 into uncompressed media data file 202 is more fully described below. By way of example only, specific values are provided to explain the insertion process. However, as is understood by one of skill in the art, many other suitable values may be selected.

In preparation for insertion 154 of first primary watermark 214 into uncompressed media data file 202, first channel portion 212 and second channel portion 216 of uncompressed media data file 202 may be divided 300 into a plurality of segments (i.e., N segments 302). Each segment (e.g., segment number 6,969) of first channel portion 212 may have a corresponding segment (e.g., segment number 6,969) in second channel portion 216. Additionally, each segment may consist of e.g., fifty frames, with each frame consisting of e.g., 1,024 samples.

An exemplary digital audio file (e.g., uncompressed media data file 202) may be encoded in Pulse-Code Modulation (PCM) format. As is known in the art, a PCM encoded digital audio file may be sampled at 44.1 kHz with sixteen bits/sample. Thus, a segment may consist of 51,200 samples, or 819,200 bits. As the number of segments per digital audio file (i.e., N segments) depends on the length of the digital audio file, a length of two minutes (i.e., one-hundred-twenty seconds) will be used for illustrative purposes. Therefore, where audio_length is the number of seconds in a given digital audio file, sample_rate is the number of samples recorded per second, and segment_size is computed as described above, dividing 300 of uncompressed media data file 202 may be performed using:

$$N = (audio\_length * sample\_rate) / segment\_size$$

$$N = (120 \text{ seconds} * 44,100 \text{ samples per second}) / (1,024 \text{ samples per frame} * 50 \text{ frames per segment})$$

Applying this to the above example of a two-minute digital audio file, the digital audio file may consist of 103.359 segments (i.e., one-hundred-three complete segments and one partial segment).

First primary and secondary watermark embedder 254 may read 304 the bitpattern of first primary watermark 214 to have a length of L markers 306, where a marker may consist of e.g., 4,096 chips. As is known in the art, a chip may represent a binary "1" or "0". As a transaction has not yet occurred, a default value for the length of first primary watermark 214 may be provided. For example, first primary watermark 214 may consist of fifty markers, totaling 204,800 chips, wherein the chips may all be pre-set to binary "1" or "0". Additionally, as first secondary watermark 218 may be the complement of first primary watermark 214 (as will be discussed in greater detail below), first secondary watermark 218 may have an equivalent length L.

For illustrative purposes, first primary watermark 214 and first secondary watermark 218 will be described as transaction identifier 226. As such, the following discussion may refer to first primary watermark 214 and first secondary watermark 218 specifically/directly, or indirectly in the form of transaction identifier 226.

Non-default information (e.g., asset identifier 228; synchronization word 230; speed change word 232; distributor identifier 234; content provider identifier 236; and space 238) may be known prior to the occurrence of a transaction. To illustrate an instance where non-default information is known apriori (as discussed above), the insertion 154 of an additional watermark (i.e., second primary watermark 220 and its complement, second secondary watermark 222) will be discussed. Thus, in addition to inserting 154 first primary watermark 214 into first channel portion 212 and first secondary watermark 218 into second channel portion 216, second primary watermark 220 (e.g., asset identifier 228) may also be inserted 154 into first channel portion 212 and second secondary watermark 222 (e.g., the complement of asset identifier 228) may also be inserted into second channel portion 216. In such a case, an actual value for M (i.e., the length of second primary watermark 220 and second secondary watermark 222 in markers) may be generated by digital media watermarking process 50 (in lieu of a default value).

Once the values of L (i.e., the length of first primary watermark 214 and first secondary watermark 218 in markers; that is the transaction identifier 226) and/or M (i.e., the length of second primary watermark 220 and second secondary watermark 222 in markers; that is asset identifier 228) are determined, digital media watermarking process 50 may generate 310 the spread spectrum watermark. As is conventionally employed in the art, the principles of Direct Sequence Spread Spectrum (DSSS) technology are utilized to generate first primary watermark 214 (e.g., transaction identifier 226) and first secondary watermark 218 (e.g., the complement of transaction identifier 226).

Figure 8:
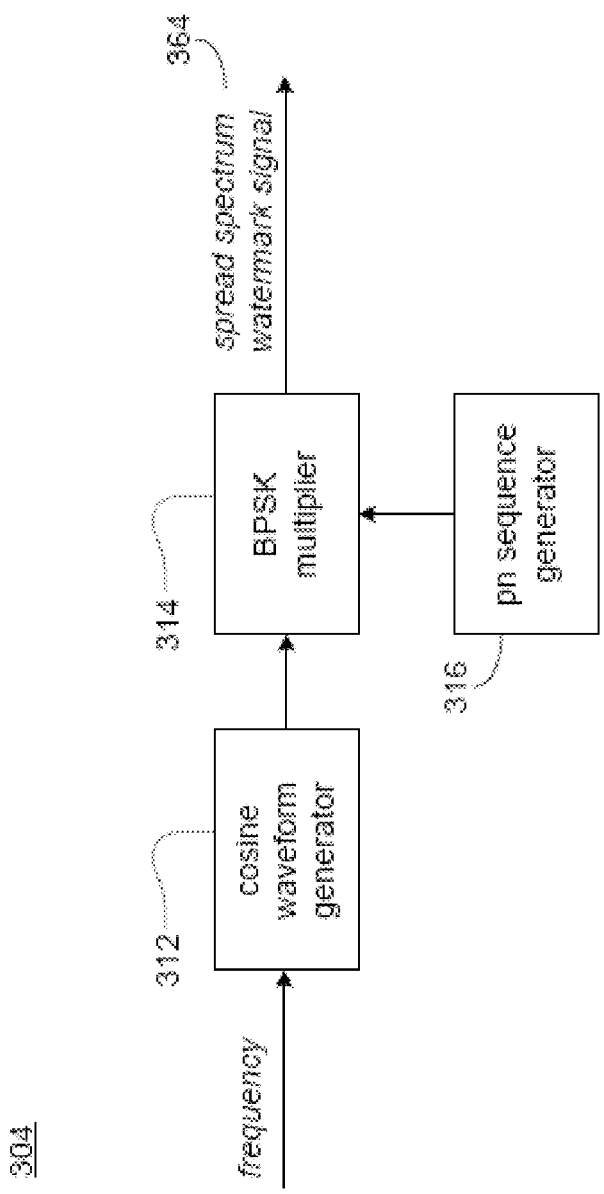
FIG. 8 is a diagrammatic view of a portion of the digital media watermarking system of FIG. 2.

For example and referring also to FIG. 8, cosine waveform generator 312 may generate a cosine waveform based upon an input of the desired frequency. Cosine waveform generator 312 may then provides the generated cosine waveform to Binary Phase Shift Keying (BPSK) Multiplier 314. Concurrently, pseudo-noise (pn) sequence generator 316 may provide an accompanying pn sequence to BPSK multiplier 314, thus enabling BPSK multiplier 314 to generate first primary watermark 214 (e.g., transaction identifier 226) and second primary watermark 220 (e.g., asset identifier 228).

As is known in the art, a pn sequence generator may generate a pn sequence that is a secondary sequence obtained from a root pn sequence by cyclic rotation. Thus, pn sequence generator 316 may generate a cosine waveform that corresponds to the state of a chip (i.e., "1" or "0") based on the root pn sequence. For example, a chip that corresponds to a cosine waveform with a length of twelve samples may be used to represent binary "1", and its complement may be used to represent binary "0". The actual length of the generated pn sequence may thus be given by $2^{12}-1$ (i.e., 4,095), which may be made even by adding a dummy chip (i.e., 4,095+1=4,096). Accordingly, the length of a single DSSS signal may be 49,152 samples (i.e., 4096*12), and such a signal may be used to represent a marker as described above.

Further and as mentioned above, processes utilizing BPSK multipliers inherently generate two types of markers (i.e., binary "1" or binary "0"), thus a pn sequence consisting of a string of binary 1's may be referred to as a positive marker. Conversely, a pn sequence consisting of a string of binary 0's may be referred to as a negative marker. Accordingly, in the event that default values are used when generating 310 first primary watermark 214 (e.g., transaction identifier 226) and first secondary watermark 218 (e.g., the complement of transaction identifier 226), BPSK multiplier 314 may generate a positive or negative marker.

Returning to FIG. 7(a), first primary and secondary watermark embedder 254 may set 318 several initial count values related to the embedding of first primary watermark 214 in first channel portion 212 and first secondary watermark 218 in second channel portion 216. As digital audio files frequently begin with low native spectral energy (i.e., low audible sound), setting 318 an initial count value may establish offset value 320, i.e., init, from which first primary watermark 214 (e.g., transaction identifier 226) and first secondary watermark 218 (e.g., the complement of transaction identifier 226) may be embedded into first channel portion 212 and second channel portion 216 (respectively) of uncompressed media data file 202. Additionally, when setting 318 an initial count value, the number of transaction identifiers 226 and the residual transaction identifiers (not shown) that may be embedded into uncompressed media data file 202 may be calculated. Setting 318 an initial count value may also initialize a counter, e.g., transID_count, that may be used to maintain the current number of times transaction identifier 226 has been embedded.

For example, where J represents the number of transaction identifiers 226 that may be inserted 154, J may be given as:

$$J=|(N-\text{init})/(L+M)|$$

$$j=|((N-\text{init})\%(L+M))/(L+1)|$$

$$J==J+j$$

As will be discussed in greater detail below, one or more synchronization markers (comprising synchronization word 230) may be embedded into first channel portion 212 and/or second channel portion 216 of uncompressed media data file 202 to enhance the detectability of a watermark (e.g., transaction identifier 226 or asset identifier 228). In such a case, the synchronization word 230 may be accounted for in the calculation of J. For example:

$$J=|(N-\text{init})/(L+M+2)|$$

$$j=|((N-\text{init})\%(L+M+2))/(L+1)|$$

$$J=J+j$$

Given the above calculated values for e.g., the number of transaction identifiers 226 (i.e., J), the length of transaction identifier 226 and asset identifier 228 (i.e., L and M respectively), and the number of segments of uncompressed media data file 202 (i.e., N), as well as other values to the extent necessary, embedding may proceed.

The remaining processes constitute a loop for embedding transaction identifier 226 (i.e., into first channel portion 212) and a complement of transaction identifier 226 (i.e., into second channel portion 216) a plurality of times, as calculated at J. For illustrative purposes, an exemplary embedding process is described. First primary and secondary watermark embedder 254 may compute 322 the offset of the location in uncompressed media data file 202 where the next transaction identifier 226 may be embedded within first channel portion 212 and the next complement of transaction identifier 226 may be embedded within second channel portion 216. First primary and secondary watermark embedder 254 may then establish 324 a segment counter (e.g., marked_segment_count) with a default value (e.g., "0") to increment as each segment is marked. Next, a nested loop of processes may be performed, starting by perceptually modulating and embedding 326 a marker (not shown) of transaction identifier 226 (where L represents the total number of markers constituting transaction identifier 226) into a segment.

Also well-known in the art is the process of perceptually weighting the amplitude of a DSSS signal (e.g., marker) to mask its frequency components by the spectral energy of the native audio. This is performed to render the marker below the threshold of human hearing (i.e., inaudible). For example, a perceptually weighted embedder (not shown) may perform a perceptual masking analysis of a segment of uncompressed media data file 202 and, using a weighting amplitude calculator (not shown), modulate the marker to be embedded in the segment. The perceptually weighted embedder may then embed the modulated marker into the segment of uncompressed media data file 202, wherein the modulated marker is inaudible to, e.g., users 88, 90, 92, 94.

After perceptually modulating and embedding 326 a marker of transaction identifier 226, first primary and secondary watermark embedder 254 may increment 328 the value of the counter representing the number of marked segments, e.g., marked_segment_count. This nested loop of processes may be repeated as long as the number of marked segments is less than the number of markers constituting transaction identifier 226 (i.e., L 306). That is, until first primary and secondary watermark embedder 254 confirms 330 that transaction identifier 226/the complement of transaction identifier 226 were successfully embedded.

Once first primary and secondary watermark embedder 254 confirms 330 that transaction identifier 226/the complement of transaction identifier 226 were embedded successfully, first primary and secondary watermark embedder 254 may 332 increment the value of the counter used to maintain the current number of times transaction identifier 226/the complement of transaction identifier 226 have been embedded (e.g., transID_count). First primary and secondary watermark embedder 254 may then confirm 334 that transaction identifier 226/the complement of transaction identifier 226 have been embedded into uncompressed media data file 202 the desired number of times. This may be accomplished by calculating whether transID_count is less than J, or by confirming that embedding has completed in accordance with a selected watermark scheme 262 (as will be discussed below in greater detail). If first primary and secondary watermark embedder 254 does not confirm 334 such, the process is repeated (from offset computation process 322). If first primary and secondary watermark embedder 254 confirms 334 that all watermarks have been successfully embedded into uncompressed digital media file 202, digital media watermarking process 50 has successfully generated watermarked uncompressed media data file 204 in accordance with the selected watermark scheme 262 (as will be discussed below in greater detail).

While the above discussion has generally described the insertion 154 of transaction identifier 226/the complement of transaction identifier 226 have into uncompressed media data file 202, the same procedure may be followed for insertion 154 of asset identifier 228, or any other watermark (e.g., synchronization word 230, speed change word 232, content provider identifier 236, distributor identifier 234, and space 238). Moreover, the above discussion has involved inserting 154 watermarks with default values (e.g., transaction identifier 226), however, this is not to be construed as a limitation of this disclosure.

For example, in many instances asset-specific information, represented by asset identifier 228 may be known apriori. That is, although transaction-specific information (represented by e.g., transaction identifier 226) may not be known prior to the initiation of a transaction by e.g., users 88, 90, 92, 94, asset-specific information related to an asset (e.g., uncompressed media data file 202) may be known in advance. Thus, rather than inserting 154 asset identifier 228 (e.g., second primary watermark 220 and second secondary watermark 222) with default values into uncompressed media data file 202, asset identifier 228 may be inserted 154 with asset-specific information. Examples of asset-specific information may include, but are not limited to: artist information, album information, track information, label information, and release date information.

As described above, digital media watermarking process 50 may include non-realtime media manager 252, which manages the transformation of uncompressed media data file 202 into watermarked compressed media data file 206. In the above example wherein asset identifier 228 may be inserted 154 into uncompressed media data file 202 (in lieu of transaction identifier 226), digital media watermarking process 50 may direct non-realtime media manager 252 to manage the delivery of uncompressed media data file 202 from uncompressed digital media library 62 to second primary and secondary watermark embedder 256. Alternatively, if first primary and secondary watermark embedder 254 first embedded e.g., one or more transaction identifiers 226 into uncompressed digital media data file 202 to form watermarked compressed media data file 206, non-realtime media manager 252 may manage the delivery of watermarked compressed media data file 206 to second primary and secondary watermark embedder 256 from first primary and secondary watermark embedder 254.

For illustrative purposes, the following description assumes that first primary and secondary watermark embedder 254 has previously embedded one or more transactional identifiers 226 (e.g., first primary watermark 214 and first secondary watermark 218) into uncompressed media data file 202 (i.e., into first channel portion 212 and second channel portion 216, respectively). However this is not intended to be a limitation of this disclosure. For example, second primary and secondary watermark embedder 256 may insert 154 second primary watermark 220 (e.g., asset identifier 228) and second secondary watermark 222 (e.g., the complement of asset identifier 228) into uncompressed media data file 202 without one or more transaction identifiers 226 having been inserted 154. As above, the following discussion may refer to second primary watermark 220 and second secondary watermark 222 specifically/directly, or indirectly in the form of asset identifier 228.

Figure 7B:
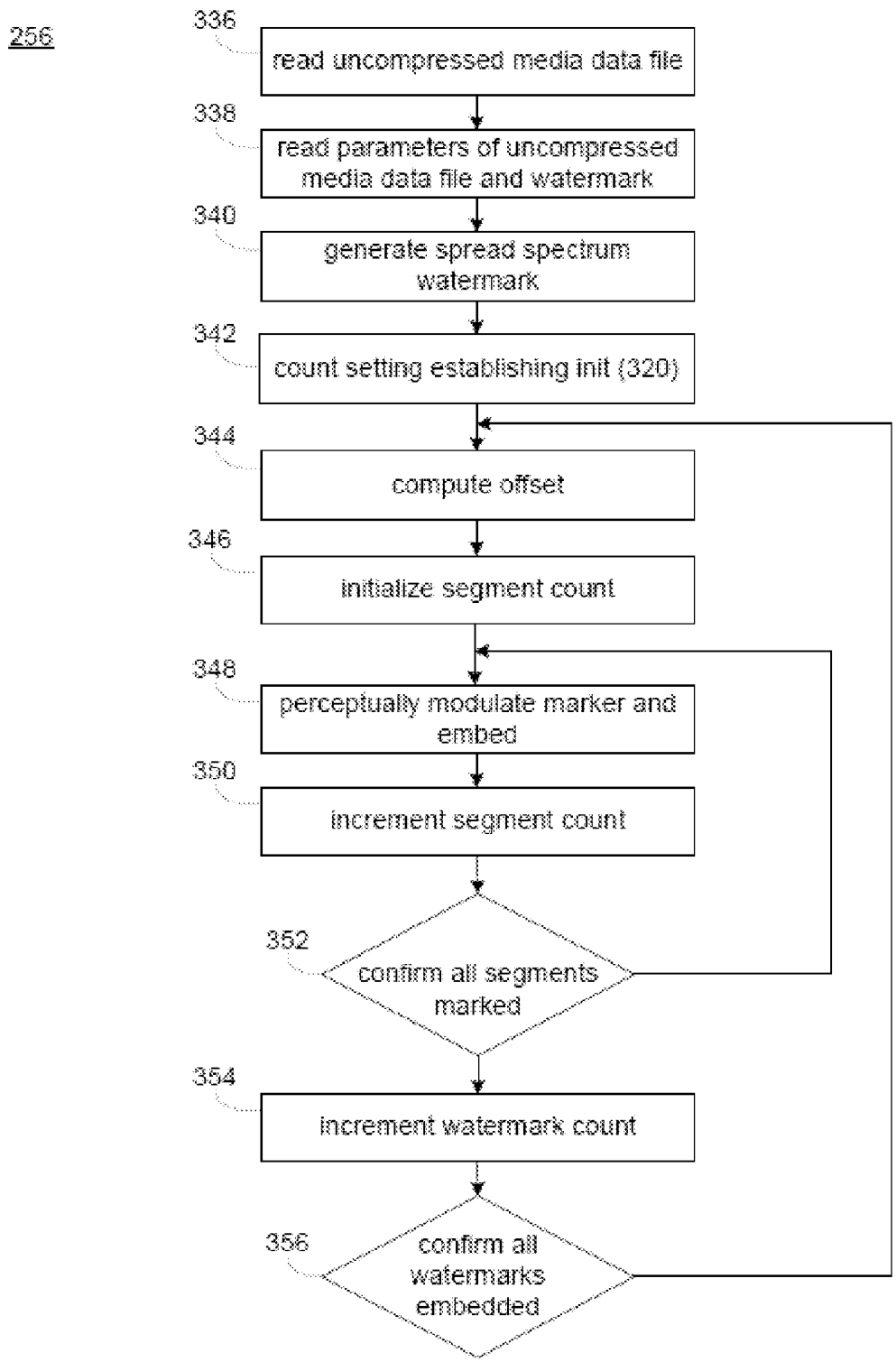
FIG. 7(b) is a flowchart of a process executed by the digital media watermarking system of FIG. 2.

Referring also to FIG. 7(b), there is shown a flowchart representing the various processes that may be utilized to insert 154 asset identifier 228 (and a complement of asset identifier 228) into uncompressed media data file 202 (i.e., at second primary and secondary watermark embedder 256). In preparation for insertion 154 of asset identifier 228 (and the complement of asset identifier 228), non-realtime media manager 252 may read 336 uncompressed media data file 202 to second primary and secondary embedder 256 from first primary and secondary watermark embedder 254.

Additionally, non-realtime media manager 252 may also read 338 the parameters (not shown) of uncompressed media data file 200 and the watermark. The parameters 260 of uncompressed media data file 202, after insertion 154 of transaction identifier 226 by first primary and secondary embedder 254, may include, but are not limited to: the number of segments included within first channel portion 212 and second channel portion 216 of uncompressed media data file 202 (i.e., N), the number of markers included within transaction identifier 226 (i.e., L), the number of markers included within asset identifier 228 (i.e., M), the residual transaction identifiers (not shown), and asset-specific information (not shown).

Given media data file parameters 260 provided by non-realtime media manager 252, second primary and secondary watermark embedder 256 may generate 340 the spread spectrum watermark. As is conventionally employed in the art, the principles of Direct Sequence Spread Spectrum (DSSS) are utilized to generate asset identifier 228. For example and referring again to FIG. 8, cosine waveform generator 312 may generate a cosine waveform based upon an input of the desired frequency. Cosine waveform generator 312 may then provide the generated cosine waveform to Binary Phase Shift Keying (BPSK) Multiplier 314. Concurrently, pseudo-noise (pn) sequence generator 316 may provide an accompanying pn sequence to BPSK multiplier 314, enabling BPSK multiplier 314 to generate asset identifier 228.

As is known in the art, a pn sequence generator may generate a pn sequence that is a secondary sequence obtained from a root pn sequence by cyclic rotation. Thus, pn sequence generator 316 generates a cosine waveform that corresponds to the state of a chip (i.e., "1" or "0") based on the root pn sequence. For example, a chip that corresponds to a cosine waveform with a length of twelve samples may be used as to represent binary "1", and its complement may be used to represent binary "0". The actual length of the generated pn sequence may thus be given by $2^{12}-1$ (i.e., 4,095), which may be made even by adding a dummy chip (i.e., 4,095+1=4,096). Accordingly, the length of a single DSSS signal may be 49,152 samples (i.e., 4,096*12), and such a signal may be used to represent a marker as described above.

Moreover, as processes utilizing BPSK multipliers inherently generate two types of markers (i.e., binary "1" or binary "0"), a pn sequence consisting of a string of binary 1's may be referred to as a positive marker. Conversely, a pn sequence consisting of a string of binary 0's may be referred to as a negative marker. Accordingly, in the event that default values are used when generating 340 second primary watermark 220 (e.g., asset identifier 228) and second secondary watermark 222 (e.g., the complement of asset identifier 228), BPSK multiplier 314 may generate a positive or negative marker.

However and as mentioned above, if asset-specific information is provided by e.g., non-realtime media manager 252, digital media watermarking process 50 may not generate 340 a positive or negative marker and may generate 340 markers comprising asset identifier 228 (and a complement of asset identifier 228) that represent the asset-specific information.

For example, if asset-specific information is available, non-realtime media manager 252 may obtain an index of asset identifiers (not shown) and, using this index, obtain an asset-specific identifier (not shown). The asset-specific identifier may then be converted to a bitpattern (not shown) that may be used by digital media watermarking process 50 to generate 340 markers including asset identifier 228 (and a complement of asset identifier 228) that represent the bitpattern.

Returning to FIG. 7(b), second primary and secondary watermark embedder 256 may set 342 several initial count values related to the embedding of asset identifier 228 (and a complement of asset identifier 228). As digital audio files frequently begin with low native spectral energy (i.e., low audible sound), setting 342 an initial count value may establish offset value 320, e.g., init, from which second primary watermark 220 (e.g., asset identifier 228) and second secondary watermark 222 (e.g., the complement of asset identifier 228) may be embedded into first channel portion 212 and second channel portion 216 (respectively) of uncompressed media data file 202.

The value derived for offset value 320 (e.g., init) may also include an offset for a previously embedded watermark (e.g., transaction identifier 226/the complement of transaction identifier 226). Additionally, when setting 342 an initial count value, the number of asset identifiers 228 that may be embedded into uncompressed media data file 202 may be calculated, taking into account not only the total number of segments (i.e., N) but also any other watermarks previously embedded (e.g., transactional identifier 226/the complement of transactional identifier). Setting 342 an initial count may also initialize a counter, e.g., assetID_count, that may be used to maintain the current number of times that asset identifier 228/the complement of asset identifier 228 have been embedded.

For example, where K represents the number of asset identifiers that may be inserted 154, K may be given as:

```
if (j == 0) {
    K = J;
}
else if (j == = 1) {
    K = J - 1;
}
```

As will be discussed in greater detail below, one or more synchronization markers (comprising synchronization word 230) may be embedded into uncompressed media data file 202 to enhance the detectability of a watermark (e.g., transaction identifier 226 or asset identifier 228). In such a case, the synchronization word 230 may be accounted for in the calculation of K.

Given the above calculated values for, namely, the number of asset identifiers 228 (i.e., K), the length of asset identifier 228 and transaction identifier 226 (i.e., M and L respectively), and the number of segments of uncompressed media data file 202 (i.e., N), as well as other values to the extent necessary, embedding may proceed.

The remaining processes constitute a loop for embedding asset identifier 228 (i.e., into first channel portion 212) and the complement of asset identifier 228 (i.e., into second channel portion 216) a plurality of times, as calculated at K. For illustrative purposes, an exemplary embedding process is described. Second primary and secondary watermark embedder 256 may compute 344 the offset of the location in uncompressed media data file 202 where the next asset identifier 228 may be embedded within first channel portion 212 and the next complement of asset identifier 228 may be embedded within second channel portion 216.

For example, where offset represents the location in uncompressed media data file 202 where the next asset identifier 228/the complement of asset identifier 228 may be embedded, offset may be given by:

$$\text{offset} = \text{init} + \text{assetID\_count} * (L+M)$$

Second primary and secondary watermark embedder 256 may establish a segment counter (e.g., marked_segment_count) with a default value (e.g., "0") to increment as each segment is marked. Next, a nested loop of processes may be performed, starting by perceptually modulating and embedding 348 a marker (not shown) of asset identifier 228 (where M represents the total number of markers constituting asset identifier 228) into a segment.

As described above, well-known in the art is the process of perceptually weighting the amplitude of a DSSS signal (i.e., marker) to mask its frequency components by the spectral energy of the native audio. This is performed to render the marker below the threshold of human hearing (i.e., inaudible). For example, a perceptually weighted embedder (not shown) may perform a perceptual masking analysis of a segment of uncompressed media data file 202 and, using a weighting amplitude calculator (not shown), modulate the marker to be embedded in the segment. The perceptually weighted embedder may then embed the modulated marker into the segment of uncompressed media data file 202, wherein the modulated marker is inaudible to, e.g., users 88, 90, 92, 94.

After perceptually modulating and embedding 348 a marker of asset identifier 228, increment segment count 350 may increment the value of the counter representing the number of marked segments, e.g., marked_segment_count. This nested loop of processes may be repeated as long as the number of marked segments is less than the number of markers constituting asset identifier 228 (i.e., M 308). That is, until second primary and secondary watermark embedder 256 confirms 352 that asset identifier 228/the complement of asset identifier 228 were successfully embedded.

Once second primary and secondary watermark embedder 256 confirms 352 that asset identifier 228/the complement of asset identifier 228 were embedded successfully, second primary and secondary watermark embedder 256 may increment 354 the value of the counter used to maintain the current number of times asset identifier 228/the complement of asset identifier 228 have been embedded (e.g., assetID_count). Second primary and secondary watermark embedder 256 may then confirm 356 that asset identifier 228/the complement of asset identifier 228 have been embedded into uncompressed media data file 202 the desired number of times. This may be accomplished by calculating whether assetID_count is less than K, or by confirming that embedding has completed in accordance with a selected watermark scheme 262 (as will be discussed below in greater detail). If second primary and secondary watermark embedder 256 does not confirm 356 such, the process is repeated (from offset computation process 344). If second primary and secondary watermark embedder 256 confirms 356 that all watermarks have been successfully embedded into uncompressed digital media file 202, digital media watermarking process 50 has successfully generated watermarked uncompressed media data file 204 in accordance with the selected watermark scheme 262 (as will be discussed below in greater detail).

Referring also to FIGS. 9(a)-9(e), watermark scheme 262 may include a variable pattern of transaction identifier 226, asset identifier 228, synchronization word 230, speed change word 232, distributor identifier 234, content provider identifier 236, and space 238. For example, the order in which watermarks (e.g., transaction identifier 226, asset identifier 228, synchronization word 230, speed change word 232, distributor identifier 234, content provider identifier 236, space 238) may be inserted 154 may conform to watermark scheme 262 or may be random. For illustrative purposes, exemplary watermark schemes 262 are provided at FIGS. 9(*a*)-(*e*), however this is not to be construed as a limitation of this disclosure. Any combination/order of watermarks (e.g., transaction identifier 226, asset identifier 228, synchronization word 230, speed change word 232, distributor identifier 234, content provider identifier 236, space 238) may be chosen for purposes of embedding.

Referring also to FIGS. 3, 4 & 6(*a*) again, upon the completion of inserting 154 all desired watermarks (as described above), digital media watermarking process 50 may compress 156 watermarked uncompressed media data file 204 to form watermarked compressed media data file 206. Digital media watermarking process 50 may also compress 158 uncompressed media data file 202 to form unwatermarked compressed media data file 208. For example, non-realtime media manager 252 may manage the delivery of watermarked uncompressed media data file 204 to watermarked digital media encoder 262 for compression 156. Concurrently, non-realtime media manager 252 may also manage the delivery of uncompressed media data file 202 to unwatermarked digital media encoder 264 for compression 158.

Watermarked digital media encoder 262 and unwatermarked digital media encoder 264 may then compress 156, 158 watermarked uncompressed media data file 204 and uncompressed media data file 202 (respectively). Non-realtime media manager 252 may also manage compression scheme parameters 258 employed by watermarked digital media encoder 262 and unwatermarked digital media encoder 264, as the compression scheme parameters 258 may need to be substantially the same for modification 150 of watermarked compressed media data file 206. Examples of compression scheme parameters 258 may include, but are not limited to, the number of frames, the identity of each frame, and the size of the frames. Encoding parameters may also vary dependent upon the compression scheme (not shown) that is employed for compression 156, 158.

Any number of known compression schemes may be employed by watermarked digital media encoder 262 and unwatermarked digital media encoder 264. Examples of such compression schemes may include but are not limited to MPEG-1, MPEG-2, MPEG-4, H.263, H.264, Advanced Audio Coding, and other techniques promulgated by e.g., the International Standards Organization and the Motion Picture Experts Group.

The resulting compressed files (i.e., watermarked compressed media data file 206 and unwatermarked compressed media data file 208) and their associated parameters (e.g., compression scheme parameters 258, media data file parameters 260, watermark scheme 262) may then be received by compressed media data library 266. Thus, compressed media data library 266 may store two compressed versions of media data file 202, one watermarked version (i.e., watermarked compressed media data file 206) and one unwatermarked version (i.e., unwatermarked compressed media data file 208).

The Realtime Process:

Referring also to FIG. 10, digital media watermarking process 50 may perform realtime processing 358. As discussed above, transactional information may not be known prior to a user (e.g., users 88, 90, 92, 94) initiating a transaction. Thus, realtime processing 358 may be utilized to modify 150 first primary watermark 214 (i.e., transaction identifier 226) and first secondary watermark 218 (i.e., the complement of transaction identifier 226) inserted 154 into e.g., watermarked compressed media data file 206 to associate it with transaction-specific information. Additionally and as discussed above, asset identifier 228/the complement of asset identifier 228 may not have been associated with asset-specific information when asset identifier 228/the complement of asset identifier 228 were inserted 154 into watermarked compressed media data file 206 during non-realtime processing 250. Thus, realtime processing 358 may also be utilized to modify 150 second primary watermark 220 (i.e., asset identifier 228) and second secondary watermark 222 (i.e., the complement of asset identifier 228) inserted 154 into e.g., watermarked compressed media data file 206 to associate it with asset-specific information.

The modification 150 of watermarked compressed media data file 206 to associate transaction identifier 226/the complement of transaction identifier 226 and asset identifier 228/the complement of asset identifier 228 with transaction-specific information and asset-specific information (respectively) is not to be construed as a limitation of this disclosure. For example, modification 150 of watermarked compressed media data file 206 may also include, but is not limited to, associating: synchronization word 230 with synchronization information; speed change word 232 with speed change information; distributor identifier 234 with distributor information; content provider identifier 236 with content provider information; and space 238 with null information.

Realtime processing 358 of digital media watermarking process 50 may include, but is not limited to, compressed media synthesizer 360 and realtime media manager 362. As will be discussed in greater detail below, compressed media synthesizer 360 may modify 150 watermarked compressed media data file 206 by combining at least a portion of unwatermarked compressed media data file 208 with at least a portion of watermarked compressed media data file 206 to form complemented media data file 200. Realtime media manager 362 may manage the transformation of watermarked compressed media data file 206 and unwatermarked compressed media data file 208 into complemented media data file 200.

Figure 11:
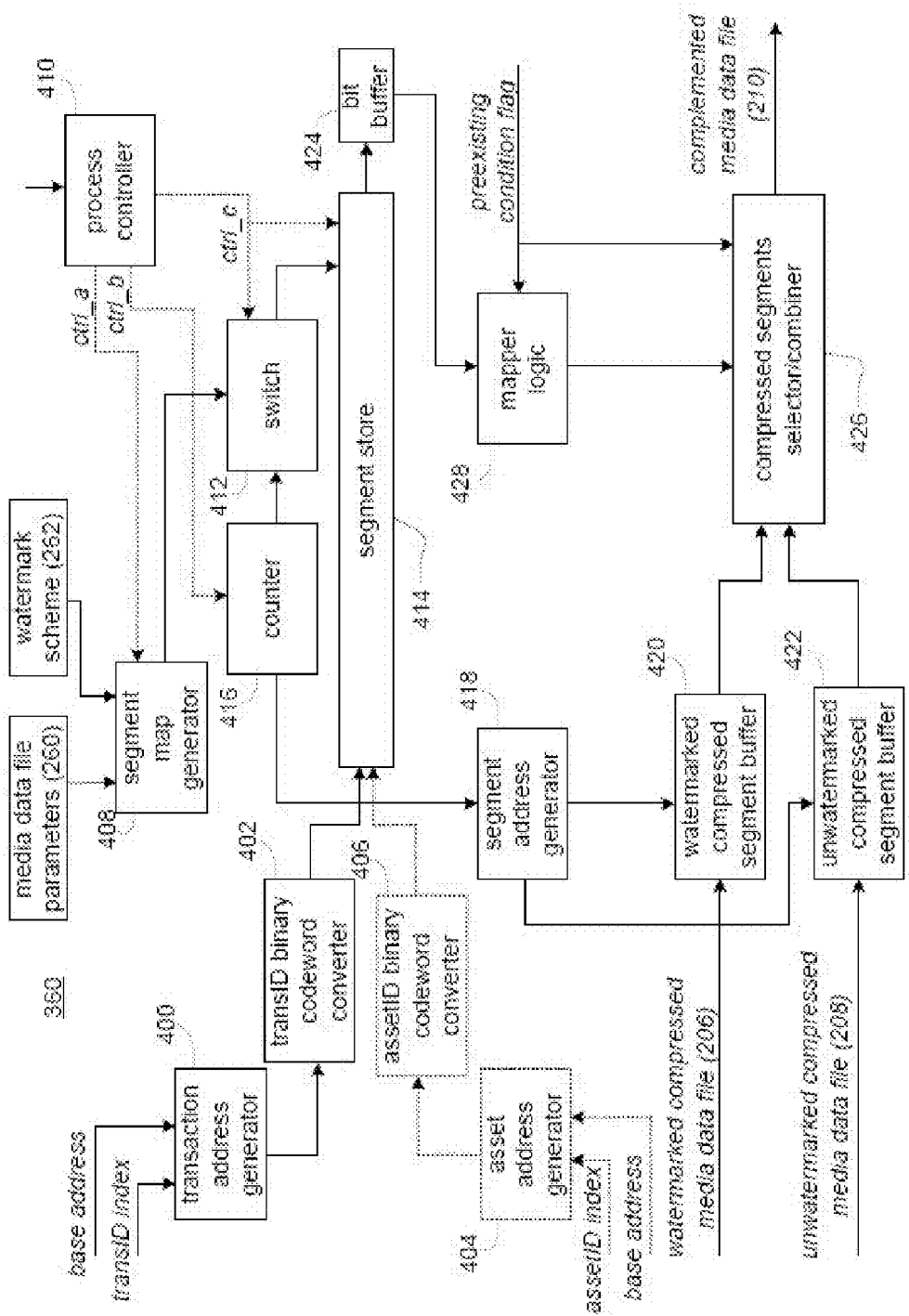
FIG. 11 is a diagrammatic view of a portion of the digital media watermarking system of FIG. 2.

Referring also to FIG. 11, there is shown an illustrative view of compressed media synthesizer 360. The following example explains the manner in which digital media watermarking system 50, and more specifically, compressed media synthesizer 360, may modify 150 watermarked compressed media data file 206 to form complemented media data file 200. Moreover, the following example assumes that default values (as described above) were utilized during insertion 154 of first primary watermark 214 (e.g., transaction identifier 226) and first secondary watermark 218 (e.g., the complement of transaction identifier 226), as well as second primary watermark 220 (e.g., asset identifier 228) and second secondary watermark 222 (e.g., the complement of asset identifier 228), into first channel portion 212 and second channel portion 216 (respectively). However, this is not intended to be a limitation of this disclosure, as non-default information (e.g., asset-specific information) may be utilized during insertion 154 of e.g., asset identifier 228/the complement of asset identifier 228. Additionally, while the following example describes the modification 150 of two specific watermarks (i.e., transaction identifier 226 (and its complement) and asset identifier 228 (and its complement)), it is to be understood that any suitable type and/or number of watermarks (as described above) may be inserted 154 and modified 150.

As noted above, first secondary watermark 218 and second secondary watermark 222 may be complements of first primary watermark 214 and second primary watermark 220 (respectively). A significant gain may be achieved by embedding watermark signals in the right channel (e.g., second channel portion 216) that are complementary to that of the signals in the left channel (e.g., first channel portion 212). Additionally, while the details of detector design are beyond the scope of this disclosure, due to the similarity of left and right channel contents (i.e., first channel portion 212 and second channel portion 216, respectively), embedding watermark complements may improve the watermark detection process. That is, audio interference generated by the embedded watermarks may be essentially eliminated due to the differencing of channels (i.e., destructive interference), thus allowing for watermarks having an amplitude sufficient to detect.

Complementing of sinusoidal waves is well known in the art. For illustrative purposes, an exemplary process of complementing a sinusoidal wave representing a watermark will be described within compressed media synthesizer 360. This is not to be construed as a limitation of this disclosure, however, as complementing may be performed in any manner as understood by one of skill in the art. Further, although the process is described as implemented by compressed media synthesizer 360, it may be implemented at any point after the necessary information (e.g., transaction-specific information, asset-specific information) is acquired.

Concerning the generation of complements, the pn sequence of length 4,096 chips that is a string of 1's and 0's represents a positive state and its complement (1's and 0's inverted) represents a negative state. The actual spread spectrum marker that is embedded is the one that results from BPSK modulation of the pn sequence by the cosine waveform and is referred to as the positive marker and is of length 4,096×12 samples, and its complement is referred to as the negative marker.

In single channel watermarking, the positive marker may be used to represent data of "1", while absence of any marker may represent a "0", with a negative marker representing the sync signal that facilitates detection of data markers. It should be understood that the assignment of a positive marker to represent data of "1", a negative marker to represent a "sync", and the lack of a marker to represent a "0", is only exemplary and is not intended to imply any limitations of this disclosure.

In dual-channel watermarking, one of the channels may follow the same procedure as that used in the single channel watermark embedding while the other channel may use a negative marker to represent data of "1", while absence of any marker represents a "0", with a positive marker representing the sync signal that facilitates detection of data markers. It should be understood that the assignment of a positive marker to represent data of "1", a negative marker to represent a "sync", and lack of a marker to represent a "0" for the first channel, and the use of a negative marker to represent data of "1", a positive marker to represent a "sync", and lack of a marker to represent a "0" for the second channel is only exemplary and is not intended to imply any limitations of this disclosure.

Figure 12A:
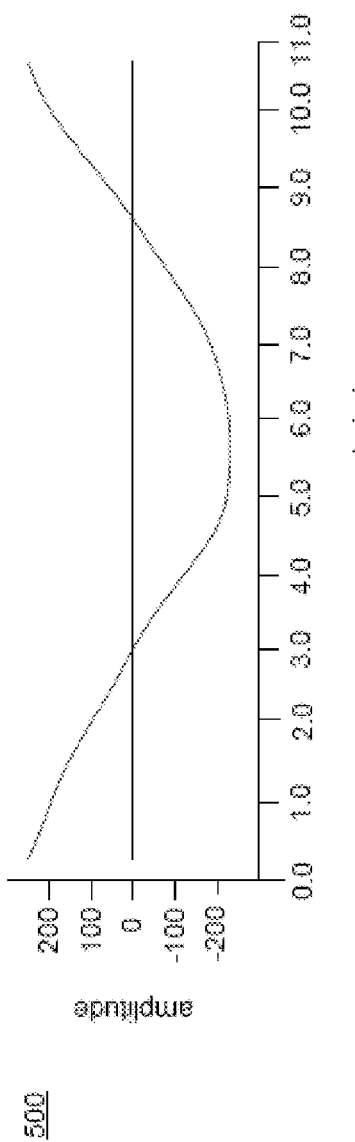
FIG. 12(a) is an illustrative view of a binary "1" chip for use within the digital media watermarking system of FIG. 2.
Figure 12B:
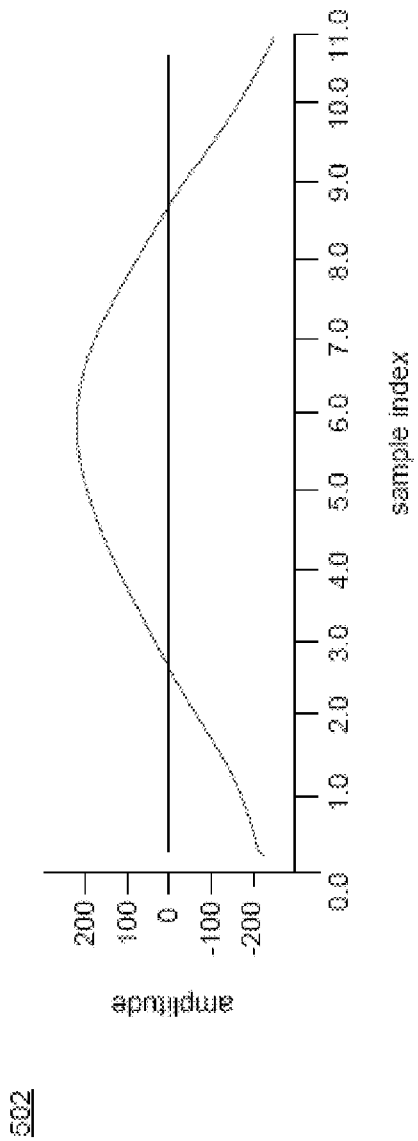
FIG. 12(b) is an illustrative view of a binary "0" chip for use within the digital media watermarking system of FIG. 2.
Figure 13A:
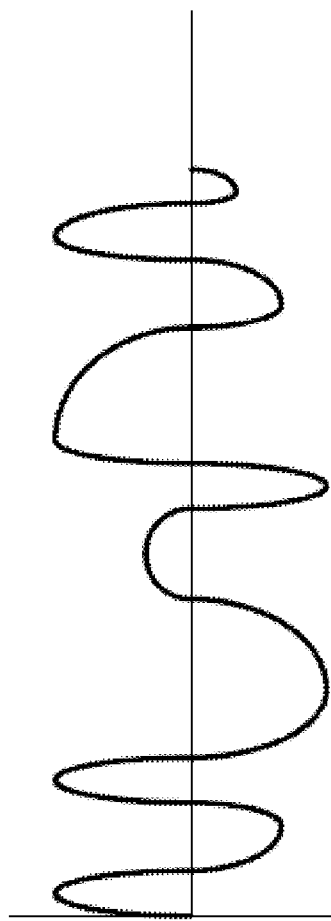
FIG. 13(a) is an illustrative view of a primary spread spectrum marker signal generated by the digital media watermarking system of FIG. 2.
Figure 13B:
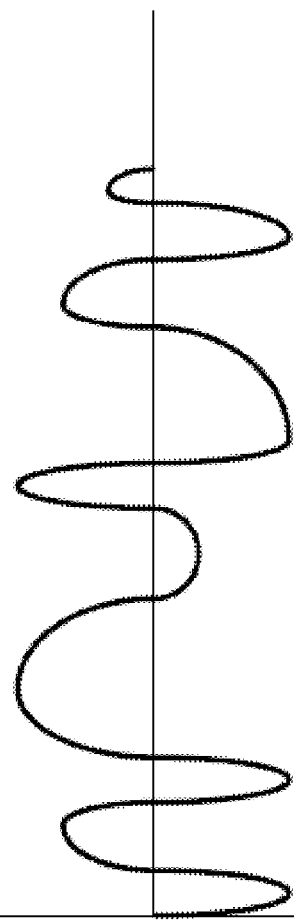
FIG. 13(b) is an illustrative view of a secondary spread spectrum marker signal generated by the digital media watermarking system of FIG. 2.

Referring also to FIGS. 12 and 13 and as discussed above, chips (a basic unit that corresponds to the root pn sequence) may be the basic building blocks of spread spectrum marker signal 364, which may be output from BPSK multiplier 314. As chips may be used to represent a binary '1' or a '0' (as mentioned above), a chip that corresponds to a cosine wave with a length of twelve audio samples may be used as a representation of a binary '1', and its complement may be used as a representation of a binary '0'. For example, FIG. 12(a) shows chip 500 that is illustrative of a chip having a value of e.g., binary '1', while FIG. 12(b) shows chip 502 that is illustrative of a chip having a value of e.g., binary '0'.

Generating a calculated series of chips 500, 502 may render primary spread spectrum marker signal 504, wherein primary spread spectrum marker signal 504 includes e.g., first primary watermark 214 or second primary watermark 220. Further, when each chip (e.g., chip 500 and/or chip 502) of primary spread spectrum marker signal 504 is complemented, secondary spread spectrum marker signal 506 may be generated. That is, if every instance of chip 500 (e.g., representing a value of binary '1') of primary spread spectrum marker signal 504 were replaced by chip 502 (e.g., representing a value of binary '0'), and every instance of chip 502 were replaced by chip 500, the complement of primary spread spectrum marker signal 504 (i.e., secondary spread spectrum marker signal 506) may be generated and output by BPSK multiplier 314. Secondary spread spectrum marker signal 506 may include e.g., first secondary watermark 218 (i.e., the complement of first primary watermark 214) or second secondary watermark 222 (i.e., the complement of second primary watermark 220).

When first channel portion 212 and second channel portion 216 of watermarked compressed media data file 206 are modified 150 to represent first primary watermark 214 and first secondary watermark 218 (or second primary watermark 220 and second secondary watermark 222), respectively; complemented media data file 200 has been generated. That is, complemented media data file 200 may comprise a plurality of watermarks in e.g., the left channel that are complemented in e.g., the right channel, thus essentially collectively eliminating the audio generated by each watermark while also doubling their strength (i.e., by providing two watermarks that may be detected).

Figure 13C:
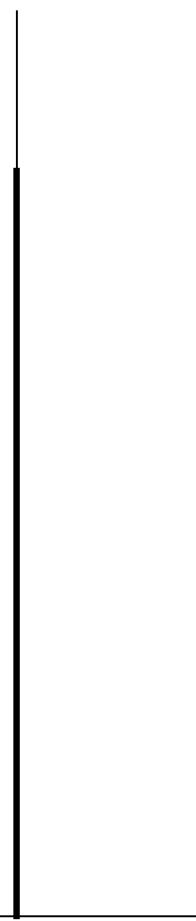
FIG. 13(c) is an illustrative view of a complemented spread spectrum marker signal generated by the digital media watermarking system of FIG. 2.

An exemplary illustration of the effect caused by embedding first primary watermark 214 in first channel portion 212 and first secondary watermark 218 in second channel portion 216 of complemented media data file 200 is provided at FIG. 13(c). As shown in FIG. 13(c), the audible interference generated by primary spread spectrum marker signal 504 is cancelled (via destructive inference) by the audible interference of secondary spread spectrum marker signal 506, thus resulting in complemented spread spectrum marker signal 508. One implementation of this process will now be described. This is not to be construed as a limitation, however, as one of skill in the art will appreciate that many processes may be utilized to generate complementary watermarks.

Referring again to FIG. 11, upon request from media distribution application 60 (e.g., when users 88, 90, 92, 94 initiate a transaction), realtime media manager 362 may provide a transID index and a base address of the index to transaction address generator 400. Transaction address generator 400 may then generate the actual address of transID and provide such to transID binary codeword converter 402. Similarly, realtime media manager 362 may provide an assetID index and a base address of the index to asset address generator 404. Asset address generator 404 may then generate the actual address of assetID and provide such to assetID binary codeword converter 406.

TransID binary codeword converter 402 and assetID binary codeword converter 406 may then convert and store a binary representation of transID (i.e., first primary watermark 214) and assetID (i.e., second primary watermark 220), respectively, to be utilized for modifying 150 watermarked compressed media data file 206. Additionally, transID binary codeword converter 402 and assetID binary codeword converter 406 may convert and store a complemented binary representation of transID (i.e., first secondary watermark 218) and assetID (i.e., second secondary watermark 222), respectively, after deriving such per the method described above. The binary output of transID binary codeword converter 402 and assetID binary codeword converter 406 may be a bitpattern (i.e., 1's and 0's), wherein each binary bit represents the watermark marker (as described above) of transID and assetID (respectively). Further, the binary output may be inverted when generating the bitpattern of the complement watermarks (e.g., first secondary watermark 218 and second secondary watermark 222).

Concurrently, realtime media manager 362 may provide a plurality of media data file parameters 260 based upon, at least in part, the attributes of uncompressed media data file 202, watermarked compressed media data file 206, and unwatermarked compressed media data file 208 to segment map generator 408. Additionally, realtime media manager 362 may also provide watermark scheme 262 to segment map generator 408. Segment map generator 408 may then output a markup-map (not shown) that provides details (e.g., the location of transaction identifiers 226 (and their complements) and asset identifiers 228 (and their complements)) pertaining to all segments of the compressed media files (i.e., watermarked compressed media data file 206 and unwatermarked compressed media data file 208).

Process controller 410 may be used to direct the flow of information in compressed media synthesizer 360. For example, when process controller 410 activates ctrl_a signal and deactivates ctrl_c signal, the output of segment map generator 408 may be transferred to switch 412. The output (as described above) of segment map generator 408, after transfer to switch 412, may serve as an address to access segment store 414 from which the bitpattern of e.g., transID and assetID (and their complemented bitpatterns) may be copied multiple times. The amount of storage, in bits, of segment store 414 may be equal to the number of segments (i.e., N) in first channel portion 212/second channel portion 216 of e.g., watermarked compressed media data file 206 that is being processed.

Additionally, counter 416 may maintain a count that may be provided to segment address generator 418 for generation of the address of a segment within first channel portion 212 and/or second channel portion 216 of watermarked compressed media data file 206 and unwatermarked compressed media data file 208 (stored in watermarked compressed segment buffer 420 and unwatermarked compressed segment buffer 422 (respectively) to be modified 150. Using the generated address, the corresponding segment from first channel portion 212 and/or second channel portion 216 of watermarked compressed segment buffer 420 and unwatermarked compressed segment buffer 422 may be copied into compressed segments selector/combiner 426. Concurrently, process controller 410 may activate ctrl_b signal to indicate that the count of counter 416 may be provided to switch 412. This may induce the individual bits stored in segment store 414 to be copied to bit buffer 424 one bit at a time.

The individual bits that were copied to bit buffer 424 may then be provided to mapper logic 428 to be utilized by compressed segments selector/combiner 426. Based on the mapped value of the bit in bit buffer 424 (at the output of mapper logic 428) compressed segments selector/combiner 426 may then select either the segment in first channel portion 212 and/or second channel portion 216 of watermarked compressed media data file 206, or the segment in first channel portion 212 and/or second channel portion 216 of unwatermarked compressed media data file 208 in the formation of complemented media data file 200.

For example, if the mapped value of the bit in bit buffer 424 (again, at the output of mapper logic 428) is "1", compressed segments selector/combiner 426 may select the segment (e.g., segment number '100') in first channel portion 212 and/or second channel portion 216 of watermarked compressed media data file 206 for use in formation of complemented media data file 200. This segment (i.e., segment number "100") may then constitute e.g., segment number "100" of complemented media data file 200. Dependent on the mapped value of the next bit in bit buffer 424 (at the output of mapper logic 428), the subsequent segment (e.g., segment number "101") of complemented media data file 200 may be formed by using e.g., segment number "101" in first channel portion 212 and/or second channel portion 216 of unwatermarked compressed media data file 208 (i.e., if the mapped value is "0"). The result of the selection/combination of segments of watermarked compressed media data file 206 and unwatermarked compressed media data file 208 by compressed segments selector/combiner 426 may form complemented media data file 200.

The logic used by mapper logic 428 for this selection/combination process accounts for several encoding concerns. For illustrative purposes only, it may be helpful to analogize mapper logic 428 to a final arbiter in the decision of whether to utilize a watermarked segment of the digital media data file (i.e., watermarked compressed media data file 206) or an unwatermarked segment of the media data file (i.e., unwatermarked compressed media data file 208) in the formation of complemented media data file 200. In such an analogy, bit buffer 424 may provide the data necessary to form a particular watermark in complemented media data file 200, and mapper logic 428 may decide, for each watermark, whether embedding is appropriate.

For example, if a series of segments have low native spectral energy (and, thus, have the undesirable effect of rendering an embedded watermark audible), a preexisting condition flag (e.g., with a mapped value of "0") may indicate to mapper logic 428 that compressed segments selector/combiner 426 should only select segments from unwatermarked compressed media data file 208 in the formation of the corresponding segments in complemented media data file 200. This logic may also be followed if mapper logic 428 is aware of metadata that may be corrupted due to the presence of a watermark.

Alternatively, if preexisting watermarks exist in e.g., uncompressed media data file 202 (e.g., synchronization words 230, speed change words 232, distributor identifiers 234, content provider identifiers 236, and space 238) that must be present in complemented media data file 200, mapper logic 428 may override the mapped value of bit buffer 424 with a value of "1". This mapped value may remain effective for the sequence of segments that comprise the preexisting watermark, thus enabling mapper logic 428 to instruct compressed segments selector/combiner 426 to select segments from e.g., watermarked compressed media file 206 in the formation of that portion of complemented media data file 200.

This selection/combination process may be repeated for all segments of the digital media data file as calculated at N, above. The combination of the watermarked and unwatermarked segments may form complemented media data file 200. This combination may include, but is not limited to, a plurality of non-default transaction identifiers 226 and asset identifiers 228. As described above, these identifiers may be used to identify information pertaining to specific transactions initiated by e.g., users 88, 90, 92, 94 as well as information pertaining to the specific asset (e.g., complemented media data file 200). Upon completion of the above-described process, realtime media manager 362 may manage the transfer of complemented media data file 200 from compressed segments selector/combiner 426 to media distribution application 60 for e.g., delivery to users 88, 90, 92, 94.

While the above discussion describes the insertion 154 of unique watermarks (e.g., transaction identifier 226 and asset identifier 228), this is not intended to be a limitation. For example, digital media watermarking process 50 may only insert 154 transaction identifier 226 (or only asset identifier 228). Furthermore, digital media watermarking process 50 may insert 154 the same watermark (e.g., transaction identifier 226 or asset identifier 228) in a multitude of locations throughout complemented media data file 200.

Figure 14:
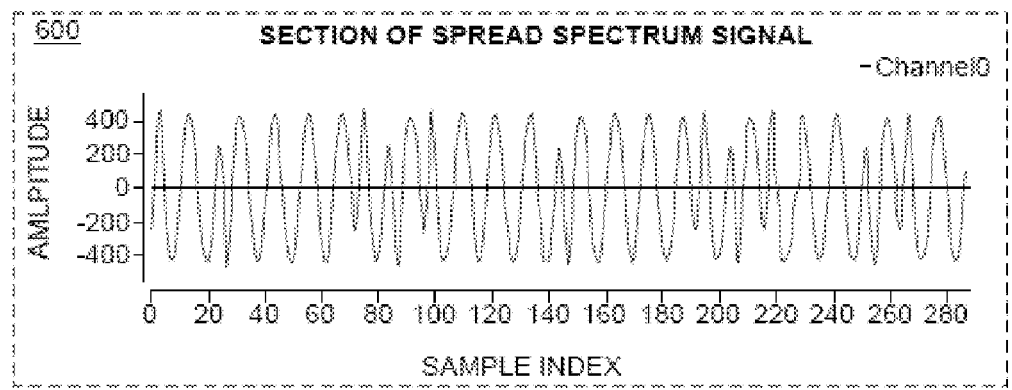
FIG. 14 is a diagrammatic view of a spread spectrum marker signal.

As discussed above, digital media watermarking process 50 may utilize spread spectrum technology to generate a spread spectrum watermark. Referring also to FIG. 14, there is shown section 600 of a spread spectrum marker signal (at the output of Binary Phase Shift Keying (BPSK) Multiplier 308).

As discussed above, digital media watermarking process 50 may utilize pn sequences. A pn sequence is a pseudorandom sequence of binary numbers and is often used in applications such as scrambling/descrambling, and direct sequence spread spectrum communication. A reason for using a pn sequence may have to do with its properties that allow one to reliably detect the presence of the pn sequence by correlating it with a known sequence to find their similarity. For example, if two sequences are identical/near identical, their correlation may possess a high peak. Conversely, if they are different, the correlation value is not peaked/is small. Accordingly, reliable detection of pn sequence based markers is possible from a portion of the pn sequence even when impacted by noise conditions, partial erasures, and intentional attacks.

To generate a pn sequence, digital media watermarking process 50 may utilize a pn sequence generator. With respect to pn sequence generators, a primitive binary polynomial (called the generator polynomial) may be expressed as:

$$G(z)=g_r z^r + g_{r-1} z^{r-1} + \ldots + g_2 z^2 + g_1 z^1 + g_0$$

Concerning the above-stated primitive binary polynomial, the leading term $g_r$ and the constant term $g_0$ of the generator polynomial may be a "1", as the polynomial is a primitive. This may result in the updated expression for the generator polynomial as follows.

$$G(z)=z^r + g_{r-1} z^{r-1} + \ldots + g_2 z^2 + g_1 z^1 + 1$$

Figure 15:
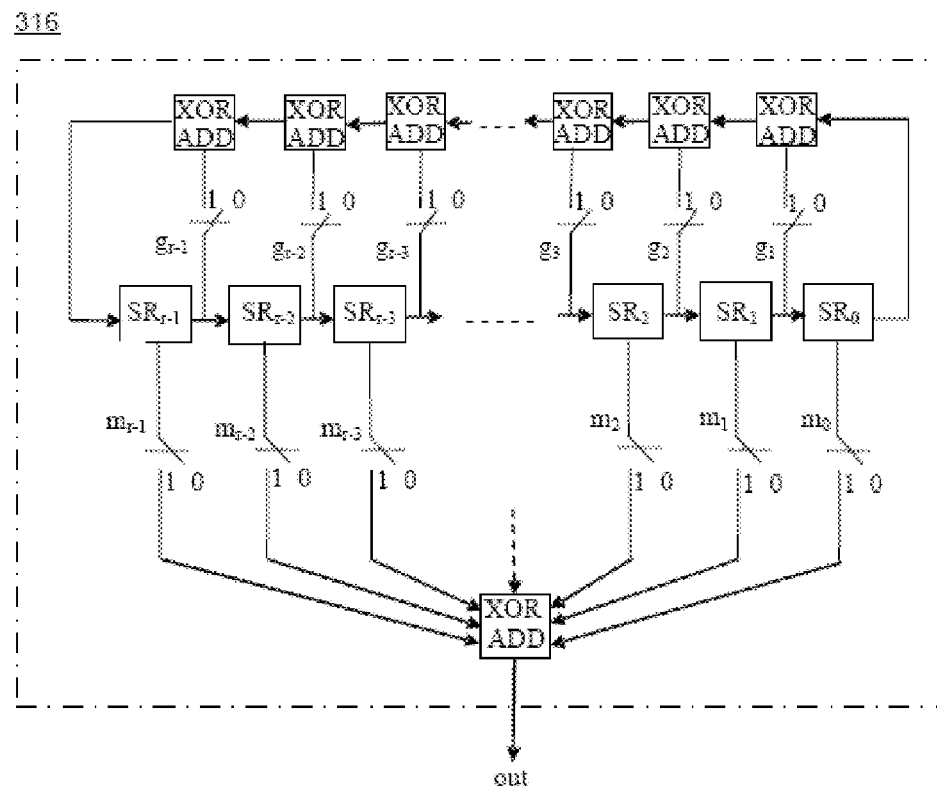
FIG. 15 is a diagrammatic view of a pn sequence generator.

The general equation of the generator polynomial stated above is known in the art as well as its mapping to the block diagram of pn sequence generator 316 (as shown in FIG. 15), which illustrates shift registers having feedback and XOR adders. All r shift registers in pn sequence generator 316 may update their values based on the values of the incoming arrow to the shift register. The adders may perform modulo 2 XOR addition (0+0=0, 0+1=1+0=1, 1+1=0). If the coefficient $g_k$ is a "1", there may be a connection between the kth register to the adder.

In general, pn sequence generator 316 may include shift registers $SR_0, SR_1, SR_2, \ldots, SR_{r-3}, SR_{r-2}, SR_{r-1}$; corresponding XOR Adders; switches $g_1, g_2, g_3, \ldots, g_{r-3}, g_{r-2}, g_{r-1}$, and switches $m_0, m_1, m_2, \ldots, m_{r-3}, m_{r-2}, m_{r-1}$.

Basically, a pn sequence may be defined by its generator polynomial that, in turn, specifies which of the $g_k$ coefficients are 1's or 0's. For example, if the following generator polynomial is used to generate a pn sequence of length 4,095, coefficients $g_6$, $g_8$, and $g_{11}$ may be set to "1", and coefficients $g_1, g_2, g_3, g_4, g_5, g_7, g_9,$ and $g_{10}$ may be set to "0".

$$G(z)=z^{12}+z^{11}+z^8+z^6+1$$

In addition, an initial state vector (e.g., a bitpattern sequence of 1's and 0's) may be used to provide an initial value of "1" or "0" to each shift register. This bitpattern may have at least a single "1" to ensure a nonzero pn sequence. Further, a shift parameter may be used to shift the output sequence with respect to the starting point by configuring one or more switches (e.g., mask $m_k$), by setting them to "1" (i.e., closed switch) or "0" (i.e., open switch). For instance if $m_0$="1" and all other mask bits are set to "0", this may correspond to only switch $m_0$ being closed while all other switches are open, thus corresponding to a delay of zero. Thus, the generator polynomial, initial bitpattern, and mask bitpattern taken together may customize pn sequence generator 316.

In order to embed the spread spectrum signal within an audio stream in an imperceptible manner, well known psychoacoustic spectral masking properties may be utilized. The human ear's inability to perceive tonal audio as well as noise like frequency components in the neighborhood of strong spectral bands may permit the embedding of a spread spectrum watermark. However, the amplitude of the signal should be carefully adapted/modulated so that all frequency components are adequately masked by the spectral energy of the native audio, thus rendering the watermark well below the threshold of human hearing (i.e., inaudible).

Figure 16:
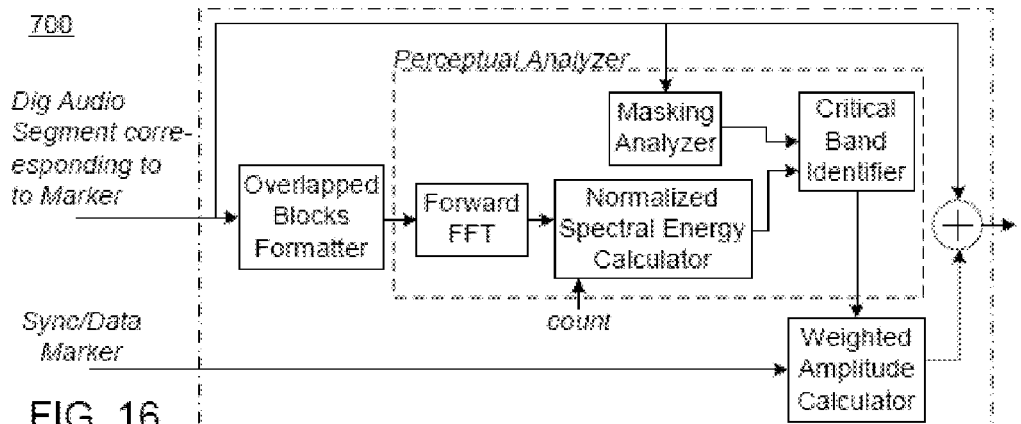
FIG. 16 is a diagrammatic view of a perceptually weighted embedder.

Referring also to FIG. 16, there is shown Perceptually Weighted Embedder 700 that may calculate the perceptual strength to be used for embedding and may embed a (sync or data) marker. The block diagram may be an implementation of the perceptual modulation and embedding process discussed above. For each marker to be embedded, a corresponding audio segment may be input to an overlapped blocks formatter, and the resulting overlapped audio blocks may be processed by a Forward FFT, which converts time domain samples into frequency domain spectral coefficients.

These FFT coefficients may be provided to a Normalized Spectral Energy Calculator that computes normalized energy in bands of this coefficient block. The normalized energy may be provided to a Critical Band Identifier that may also receive information concerning masking properties of the audio block from a Masking Analyzer. The masking properties may be local to audio and thus the amplitude of the spread spectrum signal to be used may be calculated in small audio blocks of e.g., five-hundred-twelve samples with two-hundred-fifty-six new samples and two-hundred-fifty-six samples overlapping with adjacent blocks using a window function. The perceptual masking analysis of audio may yield a masking function PM[b] such that b=0, 1 . . . 41 as indices of critical bands such as that in MPEG-2 Audio. Combining the spectral energy distribution with critical bands provides information about the worst case critical band that has the lowest masking energy. This information concerning the worst case critical band may be used for modulation by a Weighting Amplitude Calculator, which provides the sync/data marker to be embedded. As the perceptual weighting steps are individually known in the state of the art, they are not elaborated in detail. The output of Weighting Amplitude Calculator may contain the modulated sync/data marker that is then added in an adder to the original audio, resulting in output audio including the original audio plus a perceptually weighted version of the marker.

Figure 17:
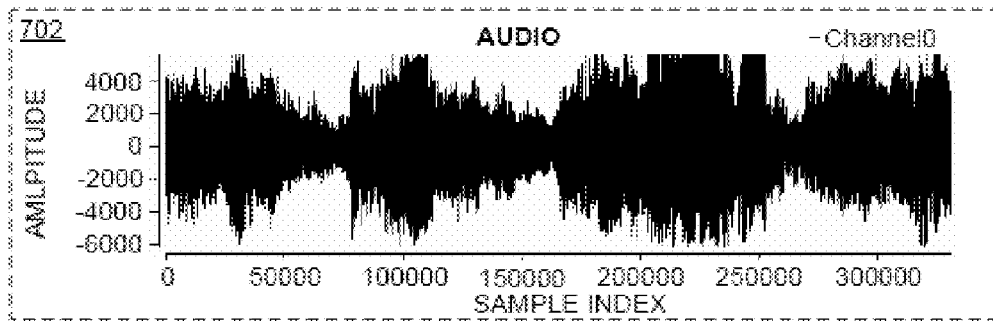
FIG. 17 is a diagrammatic view of an input audio signal.
Figure 18:
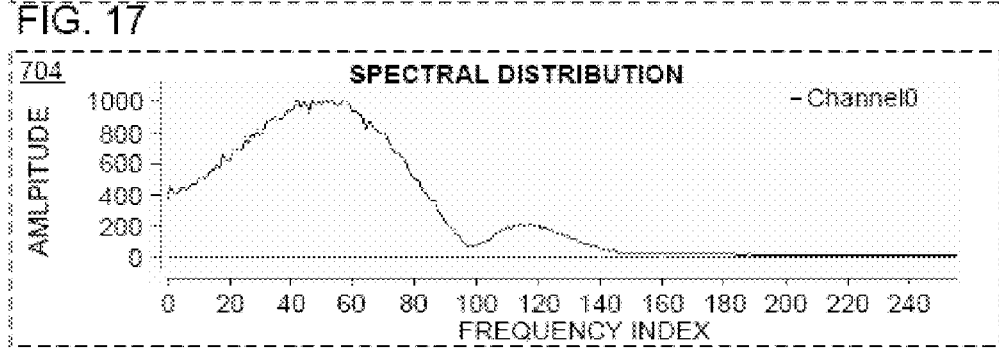
FIG. 18 is a diagrammatic view of a spectral distribution.
Figure 19:
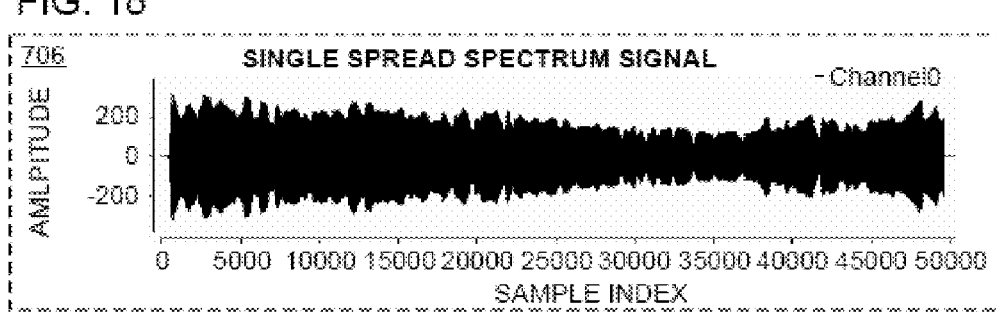
FIG. 19 is a diagrammatic view of a perceptually weighted spread spectrum marker.

For example, consider input audio signal 702 as shown in FIG. 17. By applying the above-described FFT procedures on blocks of audio, the spectral distribution 704 of its two-hundred-fifty six coefficients may be computed (as shown in FIG. 18). Further, after finding normalized energy and computing the critical bands and the worst case critical band, a perceptually weighted spread spectrum marker 706 may be generated (as shown in FIG. 19).

Digital media watermarking process 50 may further include a method of extracting a watermark. For example, digital media watermarking process 50 may obtain complemented media data file 200 that (as discussed above) includes first channel portion 212 and second channel portion 216. First channel portion 212 may include at least first primary watermark 214 and second channel portion 216 may include at least first secondary watermark 218. First secondary watermark 218 may be a complement of first primary watermark 214. A difference signal between first channel portion 212 and second channel portion 216 may be determined (e.g., complemented spread spectrum marker signal 508), whereby the strength of e.g., first primary watermark 214 may be enhanced.

A number of implementations have been described. Nevertheless, it will be understood that various modifications may be made. Accordingly, other implementations are within the scope of the following claims.

What is claimed is:

1. A method of extracting a watermark comprising:
    obtaining a digital media data file that comprises a first channel portion and a second channel portion;
    extracting at least a primary watermark from the first channel portion and at least a secondary watermark from the second channel portion, wherein the secondary watermark originally embedded in the second channel portion is a complement of the primary watermark originally embedded in the first channel portion;
    determining a difference signal by destructive interference between the first channel portion and the second channel portion, whereby the relative strength of the primary watermark with the complementary secondary watermark is enhanced, relative to considering the primary watermark alone; and
    verifying authenticity and/or integrity of both the first channel portion and the second channel portion of the digital media data file using, individually and collectively, the primary watermark, the complementary secondary watermark, and the difference signal.

2. The method of claim 1 wherein the first channel portion of the digital media data file comprises:
    a left audio channel or a right audio channel.

3. The method of claim 1 wherein the second channel portion of the digital media data file comprises:
    a right audio channel or a left audio channel.

4. The method of claim 1 wherein the verifying of the digital media data file further comprises:
    verifying the extracted secondary watermark is a complement of the extracted primary watermark and that the determined difference signal is substantially zero; and
    determining, based at least in part on the verifying of the secondary watermark and the verifying of the determined difference signal that the digital media data file was properly transmitted.

5. The method of claim 1 wherein the verifying of the digital media data file further comprises:
    verifying the extracted secondary watermark is not a complement of the extracted primary watermark and that the determined difference signal is substantially non-zero; and
    determining, based at least in part on the verifying of the secondary watermark and the verifying of the determined difference signal that the digital media data file was improperly transmitted.

\* \* \* \* \*

UNITED STATES PATENT AND TRADEMARK OFFICE
CERTIFICATE OF CORRECTION

PATENT NO. : 8,799,659 B2  Page 1 of 1
APPLICATION NO. : 12/193703
DATED : August 5, 2014
INVENTOR(S) : Venugopal Srinivasan et al.

It is certified that error appears in the above-identified patent and that said Letters Patent is hereby corrected as shown below:

On the title page, in item (56), under "OTHER PUBLICATIONS", in column 2, line 2, delete "applicaiton" and insert -- application --, therefor.

Signed and Sealed this
Eleventh Day of November, 2014

Michelle K. Lee
*Deputy Director of the United States Patent and Trademark Office*